US012509029B2

(12) United States Patent
Hokuto et al.

(10) Patent No.: US 12,509,029 B2
(45) Date of Patent: Dec. 30, 2025

(54) PEDAL DEVICE

(71) Applicant: DENSO CORPORATION, Kariya (JP)

(72) Inventors: Daisuke Hokuto, Kariya (JP); Etsugo Yanagida, Kariya (JP); Yasuhisa Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 18/454,564

(22) Filed: Aug. 23, 2023

(65) Prior Publication Data

US 2023/0406270 A1 Dec. 21, 2023

Related U.S. Application Data

(63) Continuation of application No. PCT/JP2022/005052, filed on Feb. 9, 2022.

(30) Foreign Application Priority Data

Feb. 25, 2021 (JP) .................. 2021-029092

(51) Int. Cl.
*B60T 7/06* (2006.01)
*B60T 7/04* (2006.01)
(Continued)

(52) U.S. Cl.
CPC ................ *B60T 7/042* (2013.01); *B60T 7/06* (2013.01); *G05G 1/38* (2013.01); *G05G 1/44* (2013.01);
(Continued)

(58) Field of Classification Search
CPC ... B60T 7/02; B60T 7/04; B60T 7/042; B60T 7/06; B60T 8/17; B60T 2220/04;
(Continued)

(56) References Cited

U.S. PATENT DOCUMENTS 4,944,269 A * 7/1990 Imoehl ..................... G05G 5/03
74/513
7,012,423 B2 * 3/2006 Hasegawa ................ G05G 1/30
324/207.25
(Continued)

FOREIGN PATENT DOCUMENTS

CN 208306623 1/2019
DE 4109658 A1 * 9/1992
(Continued)

OTHER PUBLICATIONS

U.S. Appl. No. 18/454,630 to Yamamoto et al., filed Aug. 23, 2023 (42 pages).
(Continued)

*Primary Examiner* — Adam D Rogers
(74) *Attorney, Agent, or Firm* — Nixon & Vanderhye P.C.

(57) ABSTRACT

An organ-type pedal device includes a housing, a shaft, a pedal pad, and a sensor unit. The housing is attached to a vehicle body. The shaft is rotatably supported around a center of a shaft receiving portion provided in the housing as a rotation axis. The pedal pad is fixed to the shaft and rotates about a same rotation axis as the shaft. The pedal pad has a structure in which a portion to be stepped on by a driver is arranged above the rotation axis in a vertical direction when being mounted on the vehicle. The sensor unit has a rotating portion provided at the shaft and a signal output portion provided at the housing for outputting a signal corresponding to a phase of the rotating portion, and detects a rotation angle of the pedal pad and the shaft.

20 Claims, 21 Drawing Sheets

(51) Int. Cl.
*G05G 1/30* (2008.04)
*G05G 1/38* (2008.04)
*G05G 1/44* (2008.04)
*G05G 1/50* (2008.04)
*G05G 5/04* (2006.01)

(52) U.S. Cl.
CPC ............... *G05G 1/50* (2013.01); *G05G 5/04* (2013.01); *B60T 2220/04* (2013.01)

(58) Field of Classification Search
CPC .. G05G 1/30; G05G 1/38; G05G 1/44; G05G 1/50; G05G 5/04
See application file for complete search history.

(56) References Cited

U.S. PATENT DOCUMENTS

| | | | |
|---|---|---|---|
| 7,498,803 B2 * | 3/2009 | Horie ................... | G05G 1/38 |
| | | | 324/207.2 |
| 8,596,162 B2 * | 12/2013 | Nozu ................... | G05G 1/30 |
| | | | 74/513 |
| 10,533,626 B2 * | 1/2020 | Kita ..................... | F16F 15/085 |
| 10,732,008 B2 * | 8/2020 | Takiguchi ............. | F16K 37/0033 |
| 10,983,549 B2 * | 4/2021 | Kadoi ................... | G05G 5/03 |
| 11,427,082 B2 * | 8/2022 | Kihara ................... | B60K 26/02 |
| 2006/0053957 A1 * | 3/2006 | Ewel ..................... | F02D 11/02 |
| | | | 74/560 |
| 2012/0056739 A1 | 3/2012 | Lee et al. | |
| 2016/0146631 A1 * | 5/2016 | Miwa ................... | B60T 7/042 |
| | | | 324/207.25 |
| 2018/0253120 A1 | 9/2018 | Kim et al. | |
| 2019/0163227 A1 | 5/2019 | Kadoi | |
| 2021/0300180 A1 | 9/2021 | Kihara et al. | |
| 2023/0391298 A1 * | 12/2023 | Fukuda ................ | B60T 7/06 |
| 2023/0393605 A1 * | 12/2023 | Hokuto ................ | B60T 7/042 |
| 2023/0393606 A1 * | 12/2023 | Fukuda ................ | G05G 1/44 |
| 2023/0393607 A1 * | 12/2023 | Yamamoto ............ | G05G 1/44 |
| 2024/0059143 A1 * | 2/2024 | Ito ........................ | G05G 1/44 |
| 2024/0059260 A1 * | 2/2024 | Ito ........................ | B60T 8/17 |
| 2024/0059261 A1 * | 2/2024 | Hokuto ................ | B60T 8/17 |
| 2024/0059262 A1 * | 2/2024 | Hokuto ................ | B60T 8/17 |
| 2024/0061461 A1 * | 2/2024 | Nishimura ............. | B60T 8/17 |
| 2024/0061462 A1 * | 2/2024 | Fukuda ................ | G05G 1/44 |
| 2024/0069587 A1 * | 2/2024 | Fukuda ................ | B60T 7/042 |
| 2024/0069588 A1 * | 2/2024 | Arao .................... | B60T 7/06 |
| 2024/0110813 A1 * | 4/2024 | Kubota ................. | G01D 5/14 |
| 2024/0116483 A1 * | 4/2024 | Yanagi ................. | B60T 13/662 |
| 2024/0294147 A1 * | 9/2024 | Nishimura ............. | G05G 1/30 |
| 2024/0383453 A1 * | 11/2024 | Ito ........................ | B60T 8/17 |

FOREIGN PATENT DOCUMENTS

| | | | | |
|---|---|---|---|---|
| JP | 54-53216 U | | 4/1979 | |
| JP | 2011-60099 A | | 3/2011 | |
| JP | 2012251809 A | * | 12/2012 | |
| JP | 2015081023 A | | 4/2015 | |
| JP | 2017049892 A | * | 3/2017 | |
| JP | 2019-67005 | | 4/2019 | |
| WO | WO-2011009674 A1 | * | 1/2011 | ............ G05G 1/38 |
| WO | WO-2020129359 A1 | * | 6/2020 | ............ B60K 26/02 |
| WO | 2022181327 A1 | | 9/2022 | |
| WO | 2022181328 A1 | | 9/2022 | |
| WO | 2022181329 A1 | | 9/2022 | |
| WO | WO-2023210806 A1 | * | 11/2023 | |

OTHER PUBLICATIONS

U.S. Appl. No. 18/454,647 to Hokuto et al., filed Aug. 23, 2023 (82 pages).
U.S. Appl. No. 18/454,564, filed Aug. 23, 2023, Pedal Device.
U.S. Appl. No. 18/454,630, filed Aug. 23, 2023, Pedal Device.
U.S. Appl. No. 18/454,647, filed Aug. 23, 2023, Pedal Device.

* cited by examiner

PEDAL DEVICE

CROSS REFERENCE TO RELATED APPLICATION

The present application is a continuation application of International Patent Application No. PCT/JP2022/005052 filed on Feb. 9, 2022, which designated the U.S. and claims the benefit of priority from Japanese Patent Application No. 2021-029092 filed on Feb. 25, 2021. The entire disclosures of all of the above applications are incorporated herein by reference.

TECHNICAL FIELD

The present disclosure relates to an organ-type pedal device mounted on a vehicle.

BACKGROUND ART

Conventionally, there has been known an organ-type pedal device used as a brake pedal device or the like, in which a pedal arm is connected to the pedal pad via a connecting link.

SUMMARY

According to an aspect of the present disclosure, an organ-type pedal device is configured to transmit an electric signal corresponding to a pedal operation amount by a driver to an electronic control device of a vehicle. The pedal device includes a housing, a shaft, a pedal pad, and a sensor unit. The housing is attached to a vehicle body. The shaft is rotatably supported around a center of a shaft receiving portion provided in the housing as a rotation axis. The pedal pad is fixed to the shaft and rotates about the same rotation axis as the shaft. Further, the pedal pad is provided with a structure in which a portion to be stepped on by the driver is arranged above the rotation axis in the vertical direction when being mounted on the vehicle. The sensor unit has a rotating portion provided at the shaft and a signal output portion provided at the housing to output a signal corresponding to a phase of the rotating portion. The sensor unit is configured to detect a rotation angle of the pedal pad and the shaft. For example, the shaft and the pedal pad may be configured to be rotatable about a common rotation axis.

BRIEF DESCRIPTION OF THE DRAWINGS

Objects, features, and advantages of the present disclosure will become more apparent from the following detailed description made with reference to the accompanying drawings, in which.

DESCRIPTION OF EMBODIMENTS

Figure 1:
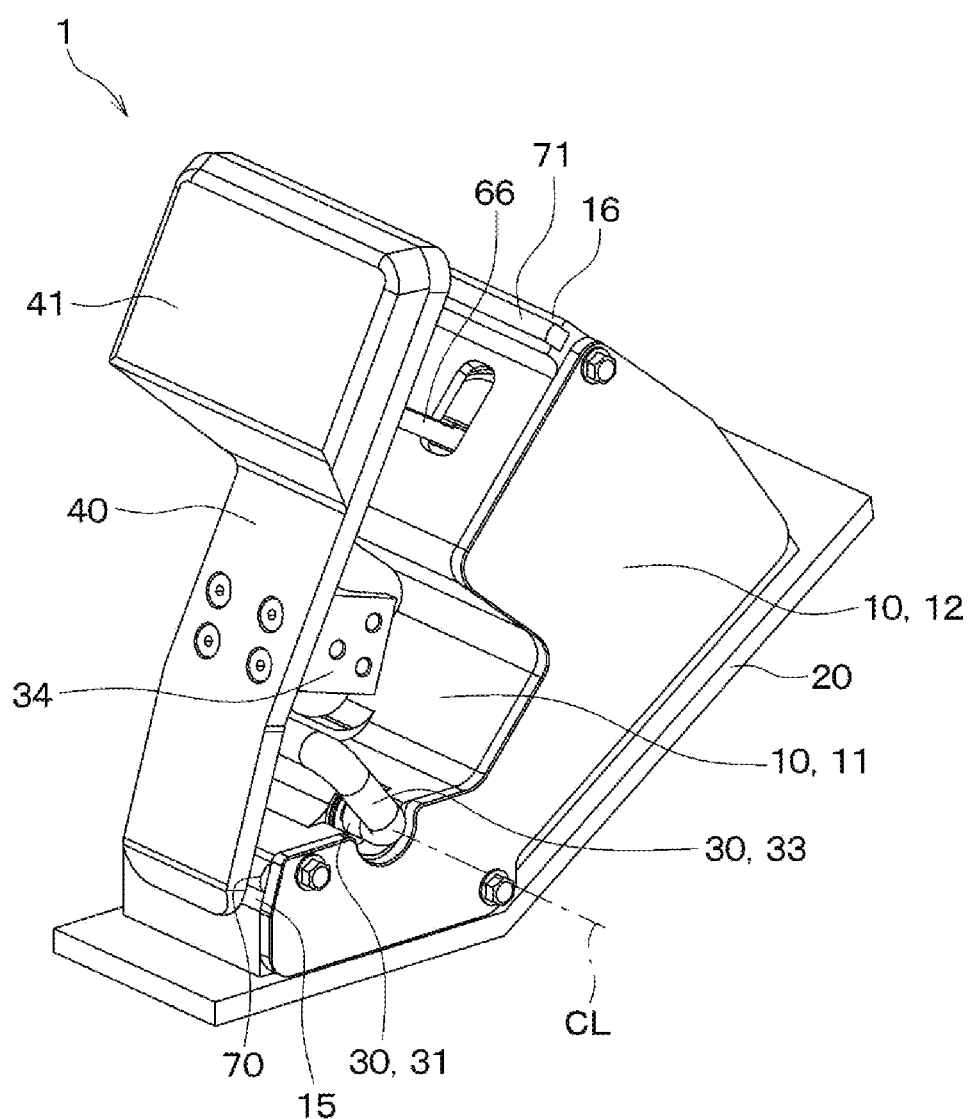
FIG. 1 is a perspective view of a pedal device according to a first embodiment.

In an organ-type pedal device, a portion of a pedal pad that is stepped on by a driver may be arranged above the center of rotation (hereinafter referred to as "rotation axis") in a vertical direction when being mounted on a vehicle. An organ-type pedal device may be used as an accelerator pedal device, a brake pedal device, or the like. For example, in the organ-type pedal device, one end of a pedal pad is rotatably connected to a+ housing. On the other hand, in the housing, a pedal arm connected to the pedal pad via a connecting link is rotatably provided around a rotation axis different from the rotation axis of the pedal pad. In this description, the rotation axis refers to an axis line that is the center of rotation of an object.

In the pedal device, when a driver's stepping force is applied to the pedal pad, the pedal pad rotates about a connection portion connected with the housing as a rotation axis. Movement of the pedal pad is transmitted through the connecting link to the pedal arm, which rotates within the housing. A sensor unit mounted inside the housing covered by a housing cover outputs an electric signal corresponding to a rotation angle of the pedal arm to an electronic control unit (hereinafter referred to as "ECU") of the vehicle. The ECU is an abbreviation of Electronic Control Unit.

In the pedal device, the rotation axis of the pedal pad and the rotation axis of the pedal arm are positioned at different positions. The sensor unit does not directly detect the rotation angle of the pedal pad, but is configured to detect the rotation angle of the pedal arm connected to the pedal pad via a connecting link. Therefore, in the pedal device, the output signal of the sensor unit may possibly deviate from the actual amount of operation of the pedal pad operated by the driver for a control of the travel of the vehicle, due to a dimensional variation of each part and an assembly variation of each part. Therefore, this pedal device may have a problem that it is difficult to perform an accurate vehicle travel control and a detection accuracy of the pedal operation amount may be low.

It is an object of the present disclosure to improve a detection accuracy of a pedal operation amount in an organ-type pedal device.

According to an aspect of the present disclosure, an organ-type pedal device that transmits an electric signal corresponding to a pedal operation amount by a driver to an electronic control device of a vehicle includes a housing, a shaft, a pedal pad, and a sensor unit. The housing is attached to a vehicle body. The shaft is rotatably supported around a center of a shaft receiving portion provided in the housing as a rotation axis. The pedal pad is fixed to the shaft and rotates about the same rotation axis as the shaft. Further, the pedal pad has a structure in which a portion to be stepped on by the driver is arranged above the rotation axis in the vertical direction when being mounted on the vehicle. The sensor unit has a rotating portion provided at the shaft and a signal output portion provided at the housing for outputting a signal corresponding to a phase of the rotating portion. The sensor unit is configured to detect a rotation angle of the pedal pad and the shaft. In addition, the shaft and the pedal pad may be configured to be rotatable about a common rotation axis.

According to the above, it is possible to directly detect the rotation angle of the pedal pad and the shaft by the sensor unit, assuming that the pedal pad and the shaft are configured to rotate about the same rotation axis. Therefore, the sensor unit outputs a highly accurate electric signal corresponding to the actual amount of operation of the pedal pad (that is, the rotation angle of the pedal pad) depressed by the driver to control the travel of the vehicle. Thus, the pedal device can improve the detection accuracy of the pedal operation amount and realize more accurate vehicle travel control.

Embodiments of the present disclosure will now be described with reference to the drawings. Parts that are identical or equivalent to each other in the following embodiments are assigned the same reference numerals and will not be described repeatedly.

First Embodiment

Figure 2:
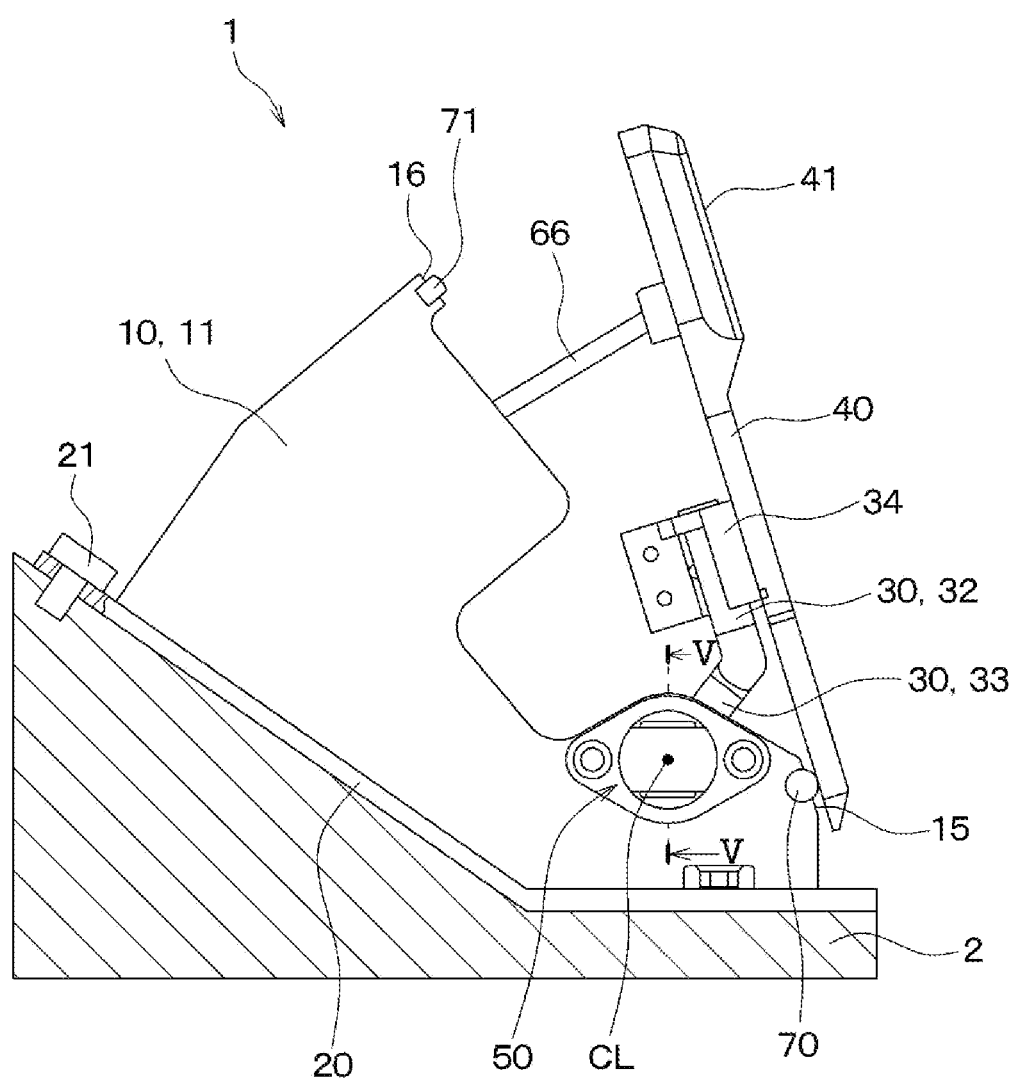
FIG. 2 is a side view showing a state where a pedal pad is at a minimum rotation angle in the pedal device according to the first embodiment.
Figure 3:
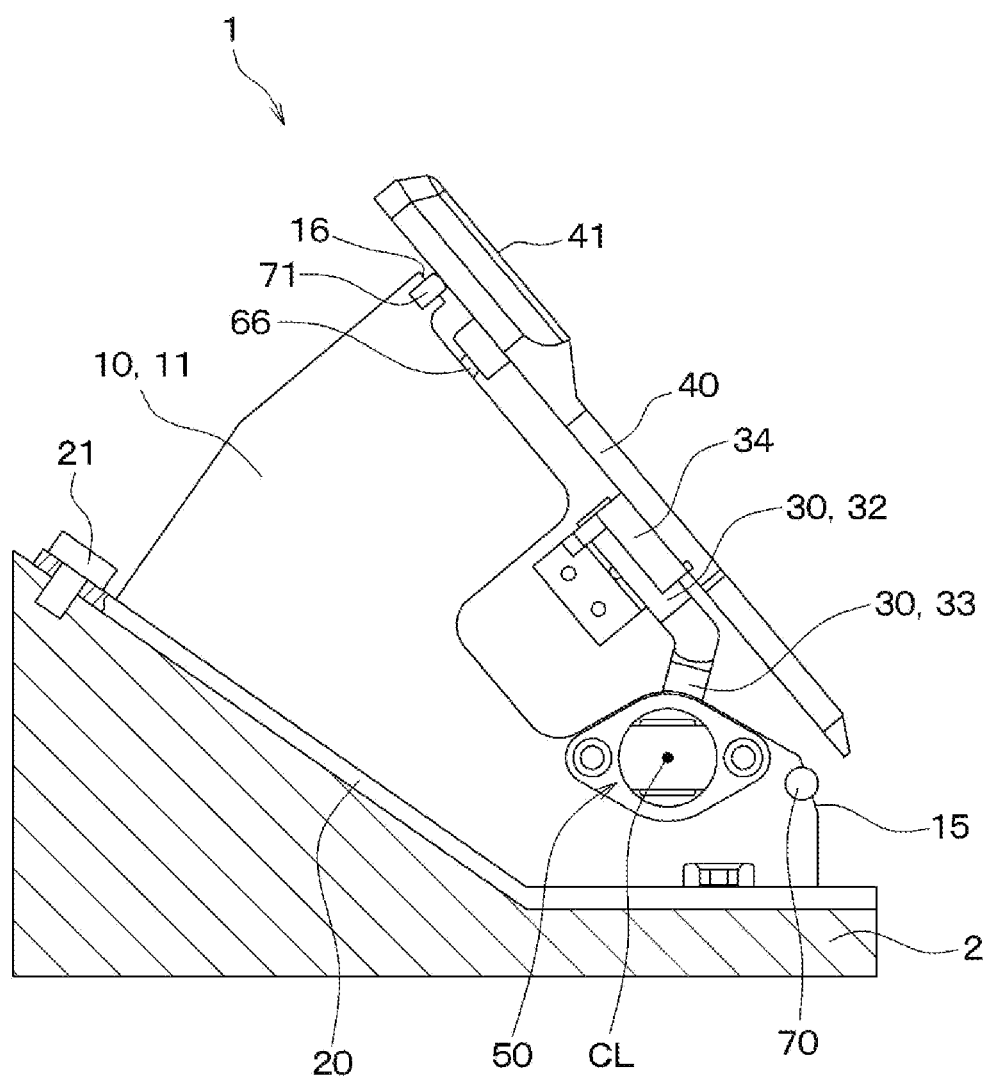
FIG. 3 is a side view showing a state where the pedal pad is at a maximum rotation angle in the pedal device according to the first embodiment.

The first embodiment is described with reference to the drawings. As shown in FIGS. 1 to 3, a pedal device 1 of the present embodiment is an organ-type pedal device 1 that is mounted on a vehicle and that is operated by a driver's stepping force. The organ-type pedal device 1 has a configuration in which a portion of the pedal pad 40 that is stepped on by the driver is arranged above a rotation center (hereinafter referred to as "rotation axis CL") in the vertical direction when mounted on the vehicle. In the organ-type pedal device 1, a portion of the pedal pad 40 that is in front of the vehicle relative to the rotation axis CL rotates toward a floor 2 or a dash panel in a passenger compartment in response to an increase in a stepping force of the driver applied to the pedal pad 40. Such an organ-type pedal device 1 is used as an accelerator pedal device, a brake pedal device, or the like. In the present embodiment, a brake pedal device is described as an example of the pedal device 1.

Figure 6:
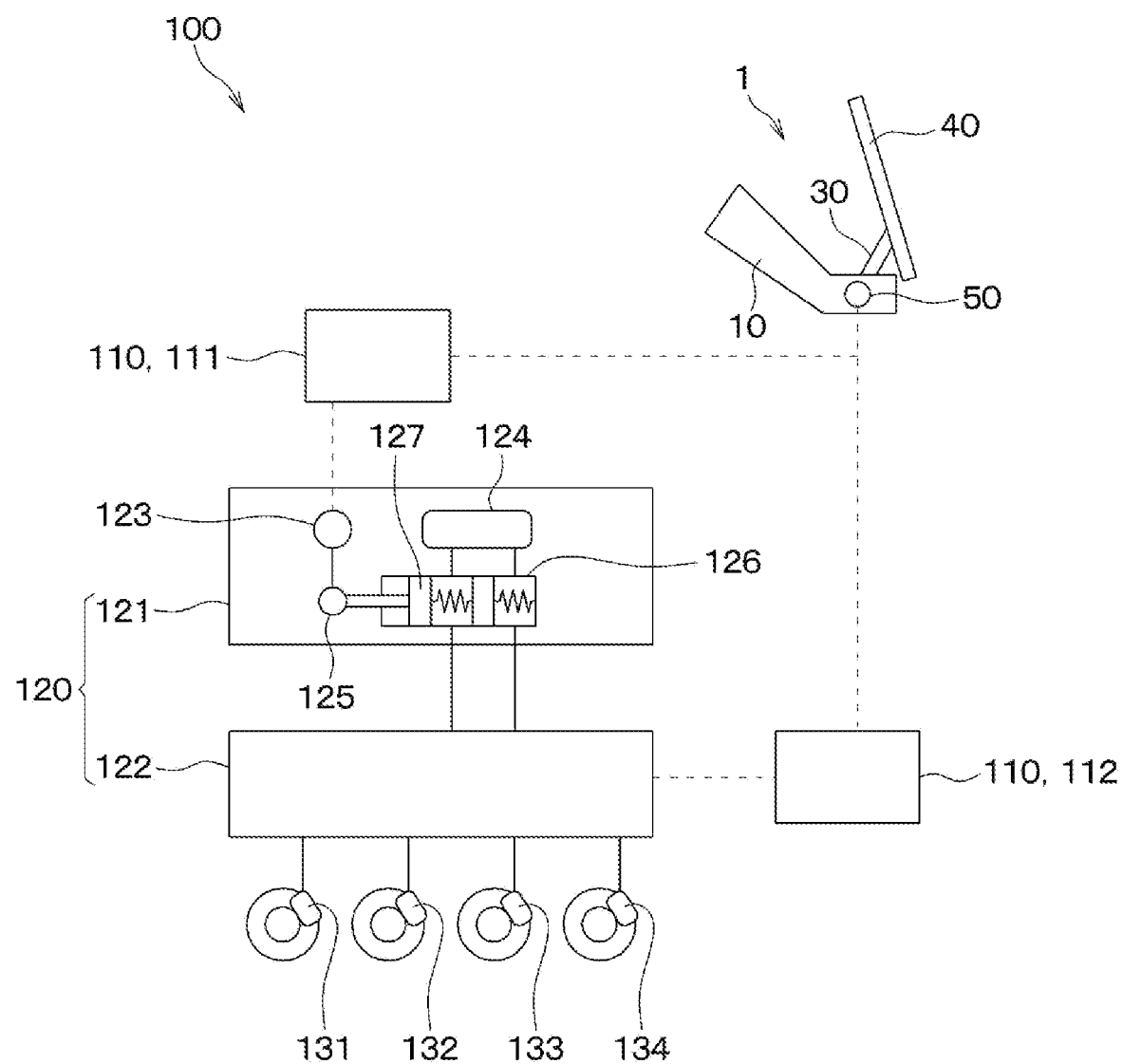
FIG. 6 is a configuration diagram of a brake-by-wire system using the pedal device according to the first embodiment.

First, a brake-by-wire system 100 using the pedal device 1 of the present embodiment is described. As shown in FIG. 6, the brake-by-wire system 100 is a system in which an electronic control unit (hereinafter referred to as "ECU 110") mounted on the vehicle drives and controls a brake circuit 120 based on an electric signal output from a sensor unit 50 of the pedal device 1. Under a drive control of the ECU 110, the brake circuit 120 generates hydraulic pressure necessary for braking the vehicle to drive wheel cylinders 131 to 134.

In the brake-by-wire system 100 illustrated in FIG. 6, the ECU 110 is configured by a first ECU 111 and a second ECU 112. Further, the brake circuit 120 is configured by a first brake circuit 121 and a second brake circuit 122.

An electric signal output from the sensor unit 50 of the pedal device 1 is transmitted to the first ECU 111 and the second ECU 112. The first ECU 111 has a microcontroller, a drive circuit, and the like (not shown). The first ECU 111 supplies electric power to a motor 123 of the first brake circuit 121 and the like to drive and control the first brake circuit 121. The second ECU 112 has a microcontroller and a drive circuit (not shown). The second ECU 112 drives and controls an electromagnetic valve, a motor, and the like (not shown) of the second brake circuit 122.

The first brake circuit 121 has a reservoir 124, the motor 123, a gear mechanism 125, a master cylinder 126, and the like. The reservoir 124 stores brake fluid. The motor 123 drives the gear mechanism 125. The gear mechanism 125 reciprocates a master piston 127 of the master cylinder 126 in the axial direction of the master cylinder 126. Movement of the master piston 127 increases the hydraulic pressure of the brake fluid supplied from the reservoir 124 to the master cylinder 126, and the hydraulic pressure is supplied from the first brake circuit 121 to the second brake circuit 122.

The second brake circuit 122 is a circuit for performing normal control, ABS control, VSC control, and the like by controlling the hydraulic pressure of each of the wheel cylinders 131 to 134 according to the control signal from the second ECU 112. ABS stands for Anti-lock Braking System, and VSC stands for Vehicle Stability Control. The wheel cylinders 131 to 134 provided for each wheel drive brake pads provided for each wheel.

When the driver of the vehicle depresses the pedal pad 40 of the pedal device 1, a signal corresponding to a rotation angle of the pedal pad 40 is output from the sensor unit 50 to the first ECU 111 and the second ECU 112. The first ECU 111 drives the motor 123 to decelerate the vehicle. As a result, when a rotation speed of the motor 123 increases, the master cylinder 126 increases the pressure of the brake fluid supplied from the reservoir 124. The hydraulic pressure of the brake fluid is transmitted from the first brake circuit 121 to the second brake circuit 122.

The second ECU 112 performs normal control, ABS control, VSC control, and the like. For example, the second ECU 112 controls driving of each solenoid valve of the second brake circuit 122 in normal control for braking according to the operation of the pedal pad 40 by the driver. The second ECU 112 causes the hydraulic pressure supplied from the first brake circuit 121 to be supplied to the wheel cylinders 131 to 134 via the second brake circuit 122. Therefore, the brake pads driven by the wheel cylinders 131 to 134 come into frictional contact with corresponding brake discs, braking the wheels, thereby decelerating the vehicle.

Also, for example, the second ECU 112 calculates a slip ratio of each wheel based on the speed of each wheel and the speed of the vehicle, and performs ABS control based on the calculation result. In ABS control, the hydraulic pressure supplied to each of the wheel cylinders 131 to 134 is adjusted to prevent each wheel from locking. Also, for example, the second ECU 112 calculates a side slip state of the vehicle based on a yaw rate, a steering angle, acceleration, each wheel speed, vehicle speed, and the like, and performs VSC control based on the calculation result. The VSC control selects a wheel to be controlled for stabilizing a turning of the vehicle, and increases the hydraulic pressure of the wheel cylinders 131 to 134 corresponding to the selected wheel, thereby suppressing the side slip of the vehicle. Thus, the vehicle can travel stably. In addition to the normal control, ABS control, and VSC control described above, the second ECU 112 may perform collision avoidance control, regenerative cooperation control, and the like based on signals from other ECUs (not shown).

Next, the pedal device is explained. As shown in FIGS. 1 to 5, the pedal device 1 includes a housing 10, a base plate 20, a shaft 30, the pedal pad 40, the sensor unit 50, and the like.

The housing 10 is attached to a portion of the vehicle body via the base plate 20. Specifically, the housing 10 is attached via the base plate 20 to an interior floor 2 of the vehicle, the dash panel, or the like. The dash panel is, by the way, a partition wall that separates an interior of the vehicle compartment from an exterior such as the engine room of the vehicle, and is sometimes called as a bulkhead.

Figure 4:
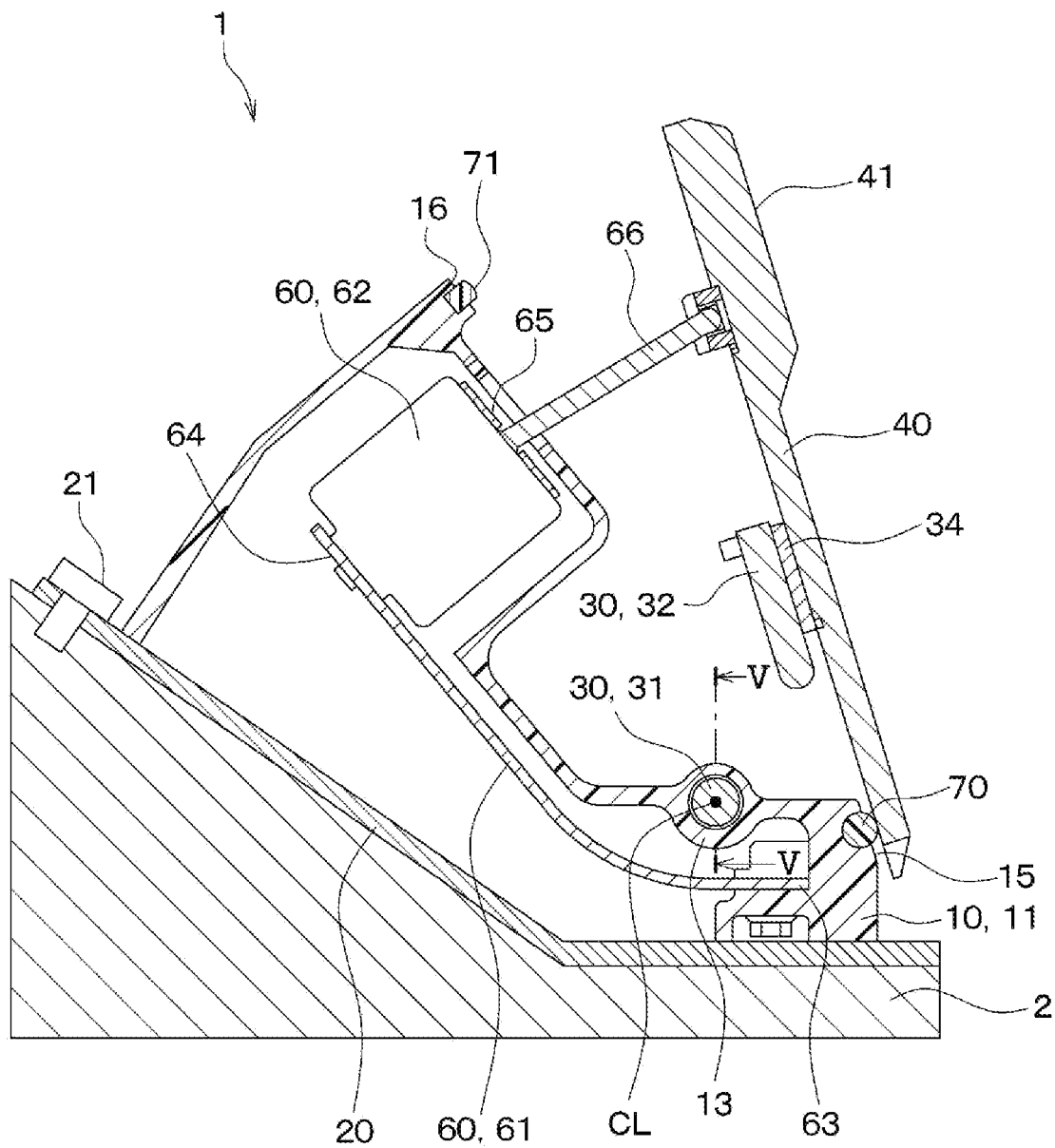
FIG. 4 is a cross-sectional view of the pedal device according to the first embodiment.
Figure 5:
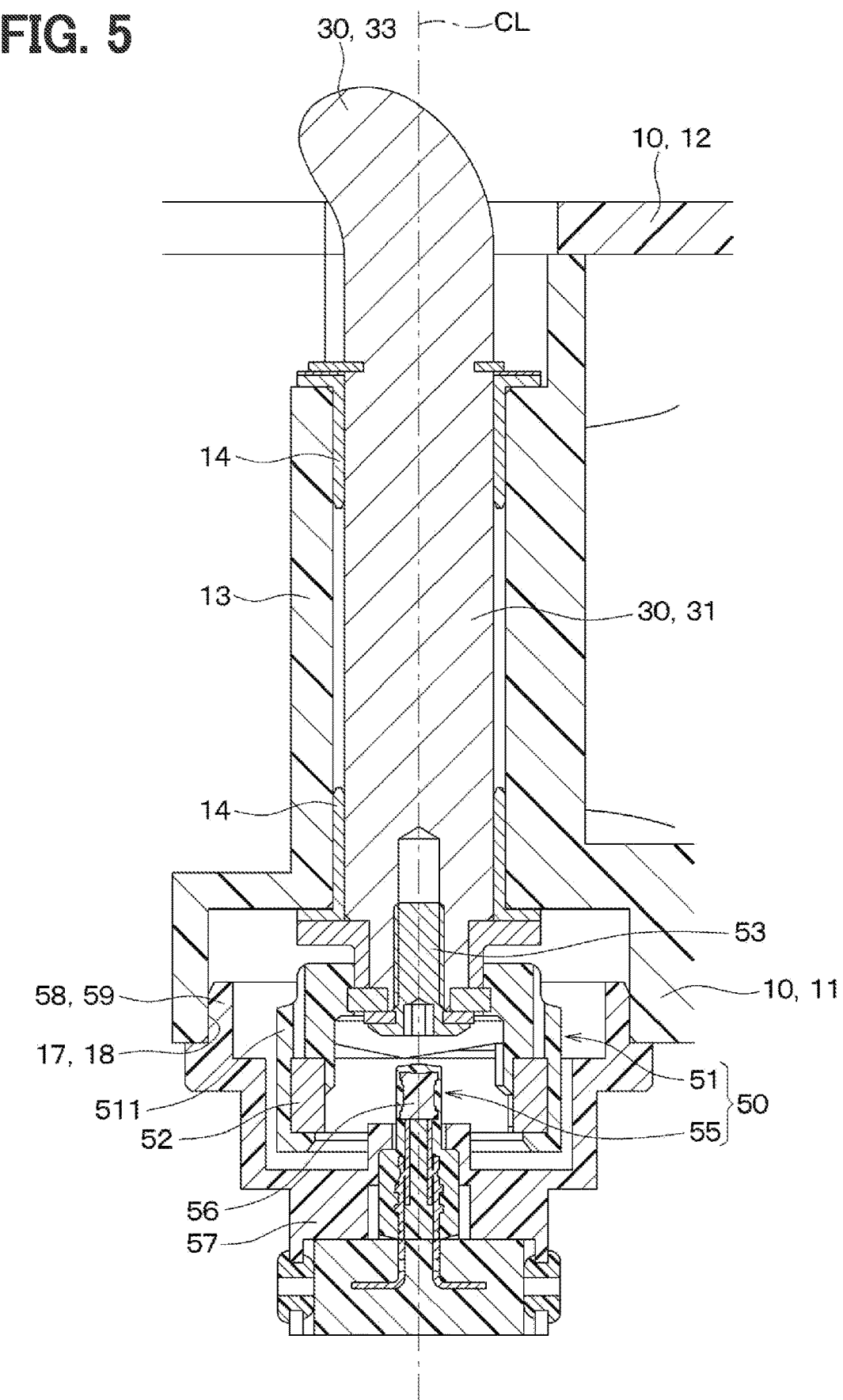
FIG. 5 is a cross-sectional view taken along a line V-V of FIGS. 2, 4.

The housing 10 has a housing body 11 and a housing cover 12. As shown in FIG. 5, the housing body 11 is provided with a shaft receiving portion 13 for rotatably supporting the shaft 30. Further, as shown in FIGS. 4 and 5, a space is formed inside the housing body 11 in which the sensor unit 50, a reaction force generating mechanism 60, and the like are provided. As shown in FIGS. 1 and 5, the housing cover 12 is provided as a side surface of the housing body 11, and closes a side opening of the space formed inside the housing body 11.

As shown in FIGS. 1 to 4, the base plate 20 is provided on a surface of the housing 10 opposite to the pedal pad 40, as shown in FIGS. 1 to 4. The base plate 20 extends continuously from a portion of the housing 10 on the front side of the vehicle to a portion thereof on the rear side of the vehicle. The base plate 20 is fixed to the floor 2 or dash panel of the vehicle by bolts 21 or the like. The base plate 20 is made of a material having a higher strength than the housing body 11, such as metal. Therefore, the base plate 20 has a function of increasing the rigidity of the housing 10 (for example, the rigidity of the shaft receiving portion 13 and its surroundings, which is described later).

As shown in FIG. 5, the shaft 30 is rotatably supported by the shaft receiving portion 13 provided on the housing body 11. Specifically, a cylindrical bearing 14 for supporting the shaft 30 is attached to the shaft receiving portion 13 provided in the housing body 11, and the shaft 30 is supported by the bearing 14. Therefore, the shaft 30 can rotate about the center of the hole of the shaft receiving portion 13 (that is, the center of the bearing 14) as the rotation axis CL. The shaft 30 is supported only by the shaft receiving portion 13 provided on the housing body 11 and is not supported by the housing cover 12.

As shown in FIGS. 1 and 5, the shaft 30 has a shape obtained by bending a columnar metal, for example, multiple times, and has a shaft portion 31, a fixing portion 32 and a connecting portion 33. The shaft portion 31 is a portion that extends parallel to the center line of the shaft receiving portion 13 (that is, the rotation axis CL of the shaft 30) and is arranged in the shaft receiving portion 13. The fixing portion 32 is a portion that is non-rotatably fixed to the pedal pad 40. In the present embodiment, the fixing portion 32 is fixed to a fixing bracket 34 provided on a surface of the pedal pad 40 opposite to the surface that receives the stepping force of the driver (hereinafter referred to as "back surface of the pedal pad 40"). The connecting portion 33 is a portion that connects the shaft portion 31 and the fixing portion 32. Since the shaft 30 has the shaft portion 31, the fixing portion 32, and the connecting portion 33, the rotation axis CL of the shaft 30 and the pedal pad 40 are arranged at positions separated from each other, and the sensor unit 50 can be easily provided in a space around the rotation axis CL.

The pedal pad 40 is made of, for example, metal or resin in a plate-like shape, and is arranged obliquely with respect to the floor 2. Specifically, the pedal pad 40 is obliquely arranged so that an upper end thereof faces the front of the vehicle and a lower end thereof faces the rear of the vehicle. A thick portion 41 is provided at an upper portion of the pedal pad 40 as a portion to be stepped on by the driver. The thick portion 41 is arranged above the rotation axis CL in the vertical direction when mounted on the vehicle. The pedal pad 40 is not limited to the arrangement shown in the drawing (e.g., in FIG. 2), and may be arranged substantially perpendicular to the floor 2, for example.

As described above, the back surface of the pedal pad 40 and the fixing portion 32 of the shaft 30 are fixed by the fixing bracket 34. Therefore, the pedal pad 40 rotates about the same rotation axis CL as the shaft 30. That is, the rotation axis CL of the pedal pad 40 and the rotation axis CL of the shaft 30 are the same. The pedal pad 40 rotates about the rotation axis CL within a predetermined angular range in forward and reverse directions in response to an increase or decrease in the stepping force of the driver.

FIGS. 1 and 2 show a state in which the stepping force of the driver is not applied to the pedal pad 40. In a state in which the stepping force of the driver is not applied to the pedal pad 40, the rotation axis CL of the pedal pad 40 and the shaft 30 is positioned separately, or away, closer to a vehicle front than a lower portion of the pedal pad 40, i.e., a portion of the pedal pad 40 at the same height or lower as to the rotation axis CL (that is, below means closer to the floor 2).

On the other hand, FIG. 3 shows a state in which the driver's stepping force is applied to the pedal pad 40, and the pedal pad 40 is rotated by receiving the stepping force. Thus, when the driver's stepping force is applied to the pedal pad 40, the vehicle-front portion of the pedal pad 40 closer to the front of the vehicle relative to the rotation axis CL is rotated toward the floor 2 or the dash panel according to the increase in the driver's stepping force. Further, as shown in FIG. 2, the vehicle-front portion of the pedal pad 40 closer to the front of the vehicle relative to the rotation axis CL rotates upward or toward the driver as the driver's stepping force applied to the pedal pad 40 decreases.

A minimum rotation position and a maximum rotation position of the pedal pad 40 are defined by a full-close stopper 70 and a full-open stopper 71, respectively. Both the full-close stopper 70 and the full-open stopper 71 are made of resin or rubber, and the surfaces that come into contact with the back surface of the pedal pad 40 are curved convexly toward the pedal pad 40.

The full-close stopper 70 is provided at a portion of the housing 10 on a rear side of the vehicle relative to the rotation axis CL of the pedal pad 40 and the shaft 30. Specifically, the full-close stopper 70 is embedded in a wall surface 15 facing obliquely upward to the rear of the vehicle in a portion of the housing 10 on the rear side of the vehicle. As shown in FIGS. 1 and 2, the full-close stopper 70 contacts the back surface of the pedal pad 40 when the stepping force of the driver is not applied to the pedal pad 40, and defines the minimum rotation position of the pedal pad 40.

The full-open stopper 71 is provided in a portion of the housing 10 on the front side of the vehicle with respect to the rotation axis CL of the pedal pad 40 and the shaft 30. Specifically, the full-open stopper 71 is provided at an upper end of a wall surface of the housing 10 on the front side of the vehicle. Specifically, the full-open stopper 71 is embedded in a wall surface 16 facing obliquely upward and rearward of the vehicle in a portion of the housing 10 on the front side of the vehicle. As shown in FIG. 3, the full-open stopper 71 comes into contact with the back surface of the pedal pad 40 when the driver's stepping force applied to the pedal pad 40 increases, and defines the maximum rotation position of the pedal pad 40.

As shown in FIG. 4, the reaction force generating mechanism 60 is provided in the housing 10 to generate a reaction force against the stepping force applied to the pedal pad 40 by the driver. Since the pedal device 1 includes the reaction force generating mechanism 60, even if the mechanical connection between the pedal pad 40 and the master cylinder 126 is eliminated, the pedal device 1 receives a reaction force at the same level as the one when the such a connection is maintained to the master cylinder 126 (i.e., the hydraulic reaction force is obtainable).

In the present embodiment, the reaction force generating mechanism 60 is configured by, for example, a leaf spring 61 (plate spring) and one or more coil springs (not shown) provided inside a holder 62. By configuring the reaction force generating mechanism 60 with one or more elastic members, it is possible to provide a predetermined stepping force characteristic according to the rotation angle of the pedal pad 40.

The leaf spring 61 is bent to form a convex curved surface toward the floor 2 when not receiving a load. One end 63 of the leaf spring 61 is arranged at a position between (a) the rotation axis CL of the shaft 30 and the pedal pad 40 and (b) the base plate 20, and is fixed to the housing 10 or the base plate 20. On the other hand, the holder 62 is fixed to an other end 64 of the leaf spring 61. The leaf spring 61 is arranged to bend along an imaginary plane perpendicular to the rotation axis CL of the pedal pad 40. Therefore, when the leaf spring 61 receives a load from the holder 62, a portion on the other end 64 where the holder 62 is fixed bends toward the base plate 20.

The holder 62 is formed in a cylindrical shape with a bottom. Although not shown, one or more coil springs or the like are provided inside the holder 62. A lid member 65 is provided at one end of the holder 62 on a pedal pad 40 side.

The lid member 65 is provided to be able to reciprocate inside the holder 62 as the coil spring provided inside the holder 62 expands and contracts. The lid member 65 and the pedal pad 40 are connected by a connecting rod 66. One end of the connecting rod 66 and the pedal pad 40 are rotatably connected, and the other end of the connecting rod 66 and the lid member 65 are rotatably connected. With such configuration, when the driver applies a stepping force to the pedal pad 40, and the pedal pad 40 rotates toward the housing 10, a load is applied from the pedal pad 40 to each member of the reaction force generating mechanism 60 via the connecting rod 66. Therefore, the leaf spring 61 and the coil spring that constitute the reaction force generating mechanism 60 generate a reaction force against the stepping force applied to the pedal pad 40 by the driver. Note that the configurations of the reaction force generating mechanism 60 and the connecting rod 66 are not limited to those illustrated above, and various other configurations are adoptable.

As described above, the pedal device 1 of the present embodiment is configured such that the pedal pad 40 and the shaft 30 rotate about the same rotation axis CL. Therefore, the amount of operation of the pedal pad 40 (that is, the rotation angle of the pedal pad 40) depressed by the driver to control the travel of the vehicle is the same as the rotation angle of the shaft 30. The rotation angle of the pedal pad 40 and the shaft 30 is directly detected by the sensor unit 50 provided on or around the rotation axis CL of the shaft 30. In the following description, the rotation angle of the pedal pad 40 and the shaft 30 is referred to as a "pedal rotation angle."

As shown in FIG. 5, the sensor unit 50 has a rotating portion 51 provided on the shaft 30 and a signal output portion 55 provided on the housing 10 for outputting a signal corresponding to the phase of the rotating portion 51. In the present embodiment, as the sensor unit 50, a non-contact-type sensor capable of detecting the pedal rotation angle is employed in which the rotating portion 51 and the signal output portion 55 are non-contacting.

The rotating portion 51 includes, for example, a magnetic circuit 52 formed in a cylindrical shape by components such as a magnet and a yoke, and a holding portion 511 that holds the magnetic circuit 52. The rotating portion 51 is fixed to one end of the shaft 30 by a bolt 53 or the like, and rotates together with the shaft 30. In the present embodiment, the rotation center of the rotating portion 51 and the rotation axis CL of the shaft 30 are the same. The magnetic circuit 52 forming the rotating portion 51 forms a magnetic field in which magnetic flux flows to intersect the rotation axis CL of the shaft 30.

On the other hand, the signal output portion 55 includes one or more Hall ICs 56, a sensor holding portion 57 for molding the Hall ICs 56, and the like. The Hall IC 56 has a Hall element and an integrated circuit for amplifying the signal output from the Hall element. The Hall IC 56 outputs an electric signal corresponding to a magnetic flux density passing through a magneto-sensitive surface of the Hall element. When the rotating portion 51 rotates about the rotation axis CL together with the shaft 30, the magnetic flux density passing through the magneto-sensitive surface of the Hall element of the Hall IC 56 changes. Therefore, the signal output portion 55 outputs an electric signal corresponding to the rotation angle of the pedal pad 40 and the shaft 30 (that is, the pedal rotation angle).

The signal output portion 55 of the sensor unit 50 and the housing 10 have a positioning structure that allows a sensor center of the signal output portion 55 to be assembled at a predetermined position. The sensor center of the signal output portion 55 is a center position of a part of the signal output portion 55 that has a sensing function. The positioning structure of the present embodiment enables the sensor center of the signal output portion 55 and the rotation axis CL of the shaft 30 to be coaxially assembled. The positioning structure is configured by, for example, a concave portion 17 provided on the housing 10 and a convex portion 58 provided on the signal output portion 55. The engagement of the concave portion 17 and the convex portion 58 places the sensor center of the signal output portion 55 on the rotation axis CL of the shaft 30.

As an example of the positioning structure, in the present embodiment, an opening 18 for installing the signal output portion 55 is provided in the housing 10 at a position corresponding to one end side of the shaft 30. The inner wall surface of the opening 18 provided in the housing 10 corresponds to the concave portion 17 of the positioning structure. On the other hand, the sensor holding portion 57 of the signal output portion 55 is provided with a protrusion 59 that engages with the inner wall surface of the opening 18 provided in the housing 10. An outer wall surface of the protrusion 59 (that is, an outer wall surface of the sensor holding portion 57) corresponds to the convex portion 58 of the positioning structure. Therefore, by an engagement of (a) the outer wall surface of the protrusion 59 provided on the sensor holding portion 57 of the signal output portion 55 with (b) the inner wall surface of the opening 18 provided on the housing 10, the sensor center of the signal output portion 55 is assembled to a predetermined position. Specifically, the sensor center of the signal output portion 55 and the rotation axis CL of the shaft 30 are assembled coaxially. Note that the configuration of the sensor unit 50 and the configuration of the positioning structure are not limited to those illustrated above, and various other configurations can be adopted as described in each of the embodiments described later.

In the configuration of the pedal device 1 of the first embodiment described above, when the stepping force of the driver is applied to the pedal pad 40, the pedal pad 40 and the shaft 30 rotate about the rotation axis CL. Then, the portion of the pedal pad 40 that is above the rotation axis CL in the vertical direction when mounted on the vehicle moves toward the floor 2 or toward the dash panel. At such time, the sensor unit 50 detects a phase change of the rotating portion 51 provided on the shaft 30 by the signal output portion 55 provided on the housing body 11. Then, the signal output portion 55 outputs an electric signal corresponding to the pedal rotation angle to the ECU 110 of the vehicle. The ECU 110 drives and controls the brake circuit 120 to generate hydraulic pressure necessary for braking the vehicle, and the hydraulic pressure drives the brake pads to decelerate or stop the vehicle.

The pedal device 1 of the first embodiment described above achieves the following effects. (1) In the first embodiment, in the organ-type pedal device 1, the pedal pad 40 and the shaft 30 are configured to rotate about the same rotation axis CL. The sensor unit 50 has the rotating portion 51 provided on the shaft 30 and the signal output portion 55 provided on the housing 10. The above-described configuration allows the sensor unit 50 to directly detect the pedal rotation angle. That is, the sensor unit 50 outputs a highly accurate electric signal corresponding to the actual amount of operation (that is, the pedal rotation angle) of the pedal pad 40 depressed by the driver to control the travel of the vehicle. Therefore, the pedal device 1 can improve the detection accuracy of the pedal operation amount, and realize more accurate vehicle travel control.

(2) The pedal device 1 of the first embodiment includes the base plate 20 provided on the surface of the housing 10 opposite to the pedal pad 40. The housing 10 is fixed to the vehicle body (specifically, to the floor 2 or to the dash panel in the passenger compartment) via the base plate 20. According to the above, the rigidity of the housing 10 is increased by providing the base plate 20 between the housing 10 and the vehicle body. Therefore, deformation of the shaft receiving portion 13 that rotatably supports the shaft 30 in the housing 10 is prevented. Thus, the pedal device 1 can prevent displacement between the rotating portion 51 and the signal output portion 55 of the sensor unit 50, and can increase the detection accuracy of the pedal rotation angle.

(3) The sensor unit 50 provided in the pedal device 1 of the first embodiment is a non-contact-type sensor capable of detecting the pedal rotation angle without contact between the rotating portion 51 and the signal output portion 55. According to the above, since there is no contact between the rotating portion 51 and the signal output portion 55, there is no wear or damage to both members, and the reliability of an output signal from the sensor unit 50 is improvable.

(4) In the first embodiment, the rotating portion 51 of the sensor unit 50 includes the magnetic circuit 52 that forms a magnetic field in which magnetic flux flows to intersect the rotation axis CL of the shaft 30. On the other hand, the signal output portion 55 of the sensor unit 50 includes the Hall IC 56 that outputs an electric signal corresponding to the magnetic field that changes as the pedal pad 40 and shaft 30 rotate. According to the above, a specific configuration of the rotating portion 51 and the signal output portion 55 of the sensor unit 50 is exemplarily shown.

(5) In the first embodiment, both the rotation center of the rotating portion 51 of the sensor unit 50 and the sensor center of the signal output portion 55 are arranged on the rotation axis CL of the shaft 30. According to the above, the detection accuracy of the pedal rotation angle by the sensor unit 50 is improvable.

(6) In the first embodiment, the signal output portion 55 of the sensor unit 50 and the housing 10 have a positioning structure that allows the sensor center of the signal output portion 55 of the sensor unit 50 to be assembled at a predetermined position. The positioning structure is configured by a concave portion 17 provided in the housing 10 and a convex portion 58 provided in the signal output portion 55, and the concave portion 17 and the convex portion 58 can be engaged. According to the above, when the signal output portion 55 of the sensor unit 50 is assembled to the housing 10, the sensor center of the signal output portion 55 is prevented from being displaced from a predetermined position, thereby the detection accuracy of the pedal rotation angle by the sensor unit 50 is improvable. In addition, in the present embodiment, the sensor center is set as a position on the rotation axis CL of the shaft 30, i.e., as a predetermined position.

(7) In the first embodiment, the inner wall surface of the opening 18 provided in the housing 10 corresponds to the concave portion 17 of the positioning structure. On the other hand, the outer wall surface of the protrusion 59 provided on the sensor holding portion 57 of the signal output portion 55 corresponds to the convex portion 58 of the positioning structure. According to the above, a specific configuration of the convex portion 58 and the concave portion 17 of the positioning structure is exemplarily shown.

(8) In the first embodiment, when the driver's stepping force is not applied to the pedal pad 40, the rotation axis CL of the pedal pad 40 and the shaft 30 is positioned separately, or away, closer to the vehicle front than a lower portion of the pedal pad 40, i.e., a portion of the pedal pad 40 at the same height or lower as to the rotation axis CL of the pedal pad 40. According to the above, it is possible to provide the sensor unit 50 in the space around the rotation axis CL of the pedal pad 40 and the shaft 30. By arranging the sensor unit 50 at a position away from the back surface of the pedal pad 40 in the driver's view, an unintentional contact the driver's foot with the sensor unit 50 or the like, causing a failure of the sensor unit 50, is preventable. Therefore, in the configuration in which the sensor unit 50 directly detects the rotation angle of the pedal pad 40, the strength and safety of the sensor unit 50 is guaranteed.

(9) In the first embodiment, the shaft 30 includes (a) the shaft portion 31 that is rotatably supported by the shaft receiving portion 13 of the housing 10, and extends parallel to the rotation axis CL, (b) the fixing portion 32 that is non-rotatably fixed to the pedal pad 40, and (c) the connecting portion 33 that connects the shaft portion 31 and the fixing portion 32. According to the above, by configuring the shaft 30 to have the shaft portion 31, the fixing portion 32 and the connecting portion 33, the rotation axis CL of the pedal pad 40 (that is, the center of the shaft portion 31) and the pedal pad 40 are separated from each other. Then, the sensor unit 50 is provided in the space around the rotation axis CL of the pedal pad 40, and the sensor unit 50 can directly detect the pedal rotation angle.

(10) In the pedal device 1 of the first embodiment, the pedal pad 40 and the shaft 30 are fixed, and the center of the shaft portion 31 of the shaft 30 serves as the rotation axis CL of the pedal pad 40. The shaft portion 31 of the shaft 30 is rotatably supported by the shaft receiving portion 13 of the housing 10. Therefore, compared to the structure in which a lower end of the pedal pad 40 formed of resin or the like is rotatably connected to the housing 10 as in Patent Document 1 shown in the background section of the present specification, the pedal pad 40 and the shaft 30 have an improved strength and durability at or around the rotation axis CL.

(11) In the first embodiment, the housing 10 has the housing body 11 and the housing cover 12. The housing body 11 rotatably supports the shaft 30, and has a positioning structure for the signal output portion 55. The housing cover 12 closes the side opening of the space formed inside the housing body 11. The housing cover 12 does not support the shaft 30 and does not have a positioning structure for the signal output portion 55. If the housing body 11 and the housing cover 12 are configured to support the shaft 30, the rotation axis CL of the shaft 30 may be tilted due to variations in assembly of the housing body 11 and the housing cover 12. In contrast, in the present embodiment, the shaft 30 is supported only by the housing body 11, and the housing cover 12 does not support the shaft 30, thereby preventing the rotation axis CL of the shaft 30 from tilting with respect to the housing body 11. Further, by providing a positioning structure for the signal output portion 55 in the housing body 11, displacement between the signal output portion 55 and the rotation axis CL of the shaft 30 is preventable, thereby the detection accuracy of the pedal rotation angle is improvable.

(12) The pedal device 1 of the first embodiment includes the bearing 14 arranged at a position between the housing body 11 and the shaft 30. According to the above, it is possible to reduce wear of the housing 10 and the shaft 30 by using the bearing 14. Therefore, tilting of the rotation axis CL of the pedal pad 40 and the shaft 30 with respect to the housing 10 that fixes the signal output portion 55 of the sensor unit 50 is prevented, and the detection accuracy of the pedal rotation angle by the sensor unit 50 is improved.

(13) The pedal device 1 of the first embodiment further includes the full-close stopper 70 and the full-open stopper 71. The full-open stopper 71 is provided at a portion of the housing 10 on the front side of the vehicle relative to the shaft receiving portion 13, and directly contacts the pedal pad 40 when the driver's stepping force applied to the pedal pad 40 increases, and defines the maximum rotational position of the pedal pad 40. The full-close stopper 70 is provided at a portion of the housing 10 on the rear side of the vehicle relative to the shaft receiving portion 13, and directly contacts the pedal pad 40 when the stepping force of the driver is not applied to the pedal pad 40, and defines the minimum rotational position. According to the above, by defining the minimum rotation angle and the maximum rotation angle of the pedal pad 40, the variation in the characteristic of the output signal with respect to the pedal rotation angle output from the sensor unit 50 is reducible, and the reliability of the output signal of the sensor unit 50 is improvable. Further, by restricting the pedal pad 40 from rotating beyond a design value, it is possible to prevent the pedal pad 40 from rotating into an unintended range, thereby guaranteeing the strength and safety of the pedal device 1.

(14) The pedal device 1 of the first embodiment is a brake pedal used in the brake-by-wire system 100. According to the above, by using the pedal device 1 of the first embodiment in the brake-by-wire system 100, the ECU 110 can realize more accurate vehicle travel control, based on the highly accurate electric signal output from the sensor unit 50 of the pedal device 1.

Second Embodiment

The following describes the second embodiment of the present disclosure. The second embodiment changes a part of the structure, such as a shaft 30, with respect to the first embodiment. Since the rest is the same as the first embodiment, only a part different from the first embodiment is mainly explained.

Figure 7:
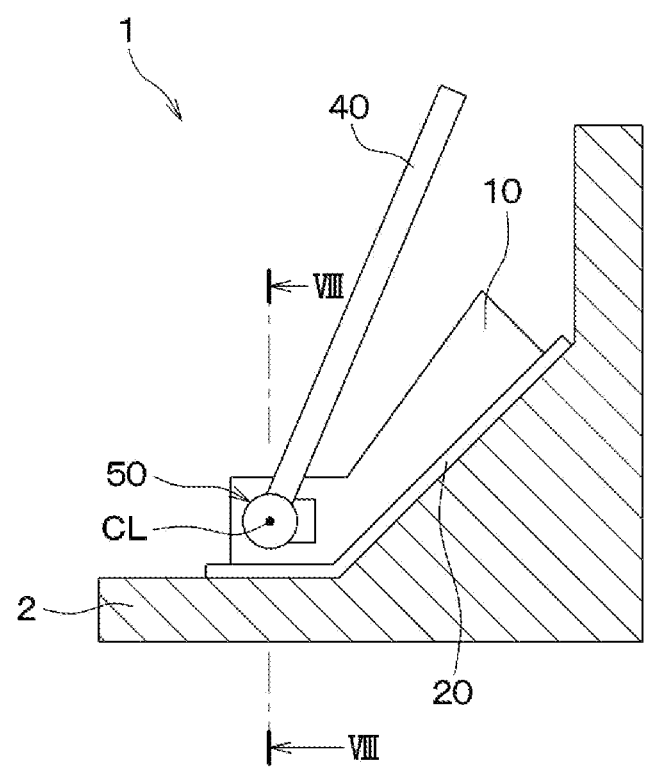
FIG. 7 is a schematic diagram of a pedal device according to a second embodiment.
Figure 8:
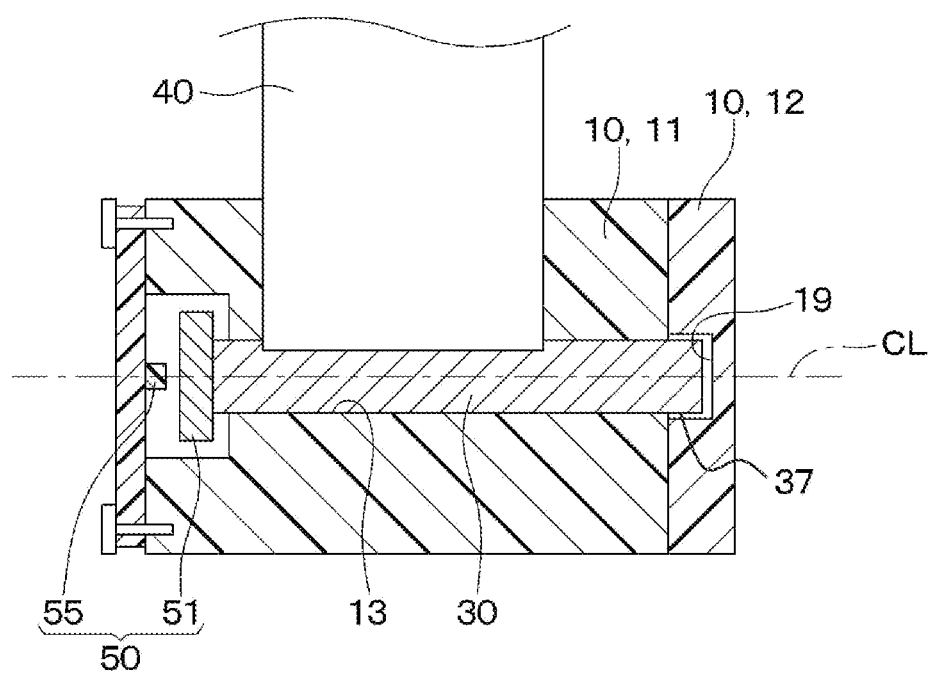
FIG. 8 is a cross-sectional view taken along a line VIII-VIII in FIG. 7.

As shown in FIGS. 7 and 8, in the second embodiment, a shaft 30 provided in a pedal device 1 is fixed to a lower end of a pedal pad 40. The shaft 30 is made of, for example, a column shape metal. The shaft 30 is rotatably supported by the inner wall of a shaft receiving portion 13 provided in a housing body 11. An end portion 37 of the shaft 30 opposite to a sensor unit 50 is inserted into a hole 19 provided in a housing cover 12.

The shaft 30 is rotatable around the center of the shaft receiving portion 13. The pedal pad 40 fixed to the shaft 30 rotates about the same rotation axis CL as the shaft 30. That is, the rotation axis CL of the pedal pad 40 and the rotation axis CL of the shaft 30 are the same. Therefore, in the second embodiment as well, the amount of operation (that is, the pedal rotation angle) of the pedal pad 40 depressed by the driver to control the travel of the vehicle is the same as the rotation angle of the shaft 30. The pedal rotation angle is directly detected by the sensor unit 50 provided on the rotation axis CL of the shaft 30 or around the rotation axis CL.

As shown in FIG. 8, the sensor unit 50 has a rotating portion 51 provided at the shaft 30 and a signal output portion 55 provided at the housing 10 for outputting a signal corresponding to the phase of the rotating portion 51. In the second embodiment, as in the first embodiment, as the sensor unit 50, a non-contact-type sensor capable of detecting the pedal rotation angle without contact between the rotating portion 51 and the signal output portion 55 is employed.

Figure 9:
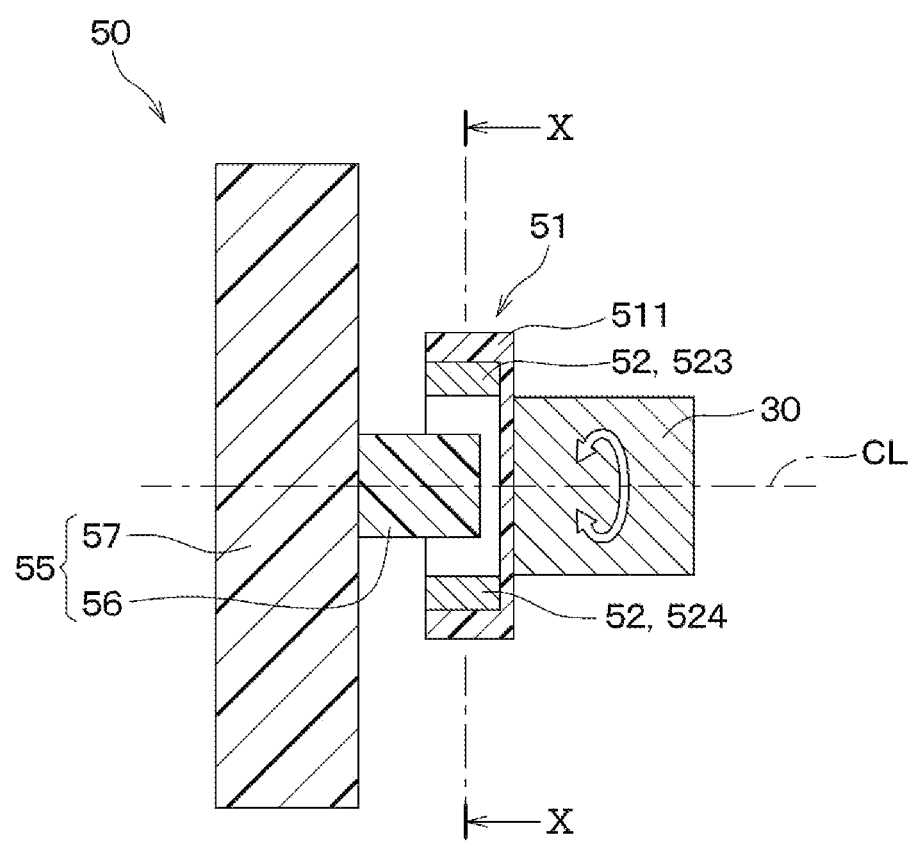
FIG. 9 is a cross-sectional view of a sensor unit provided in the pedal device according to the second embodiment.
Figure 10:
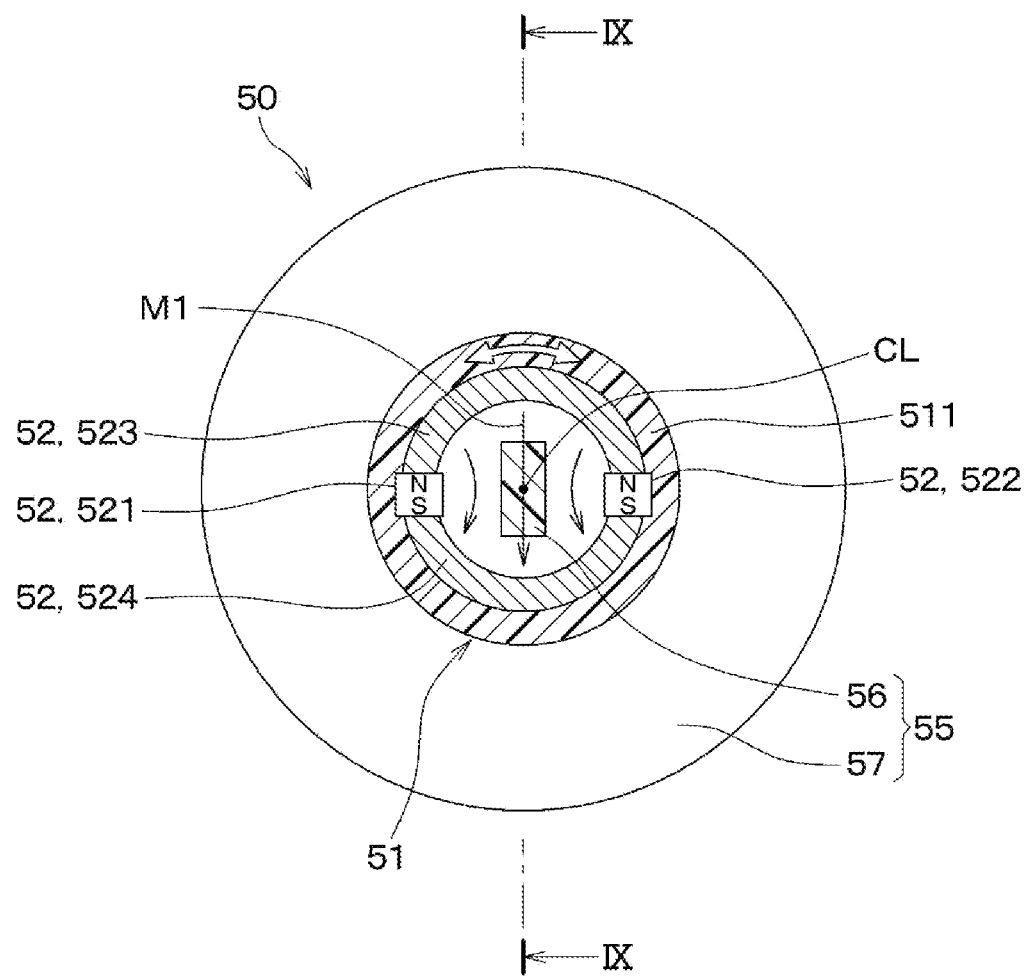
FIG. 10 is a cross-sectional view taken along a line X-X in FIG. 9.

As shown in FIGS. 9 and 10, the rotating portion 51 includes the magnetic circuit 52 formed cylindrically by magnets 521 and 522, yokes 523 and 524, and the like. Specifically, one yoke 523 formed in a semicircular shape connects the north poles of the two magnets 521 and 522, and the other yoke 524 connects the south poles of the two magnets 521 and 522. Therefore, as indicated by an arrow M1 in FIG. 10, a magnetic field is formed in which the magnetic flux flies from one yoke 523 to the other yoke 524. That is, the magnetic circuit 52 forms a magnetic field in which magnetic flux flows to intersect the rotation axis CL of the shaft 30. The rotating portion 51 including the magnetic circuit 52 is fixed to one end of the shaft 30 and rotates with the shaft 30. The rotation center of the rotating portion 51 and the rotation axis CL of the shaft 30 are the same.

On the other hand, the signal output portion 55 includes the Hall IC 56, the sensor holding portion 57 for molding the Hall IC 56, and the like. The sensor holding portion 57 is positioned and fixed to the housing 10 by a positioning structure such as engaging and screws. When the rotating portion 51 rotates about the rotation axis CL together with the shaft 30, the direction of the magnetic flux flying between the two yokes 523 and 524 changes, and the magnetic flux density passing through the magnetic sensing surface of the Hall element of the Hall IC 56 changes. Therefore, the signal output portion 55 outputs an electric signal corresponding to the pedal rotation angle.

The pedal device 1 of the second embodiment described above can achieve the corresponding effects as the first embodiment from the corresponding configuration as the first embodiment. Further, in the second embodiment, the shaft 30 provided in the pedal device 1 does not have the connecting portion 33 or the like, so the structure of the shaft 30 can be simplified.

Third Embodiment

The following describes the third embodiment of the present disclosure. The third embodiment is the same as the first embodiment and the like, except for a part of the structure of a sensor unit 50, thereby only the part different from the first embodiment is mainly described.

Figure 11:
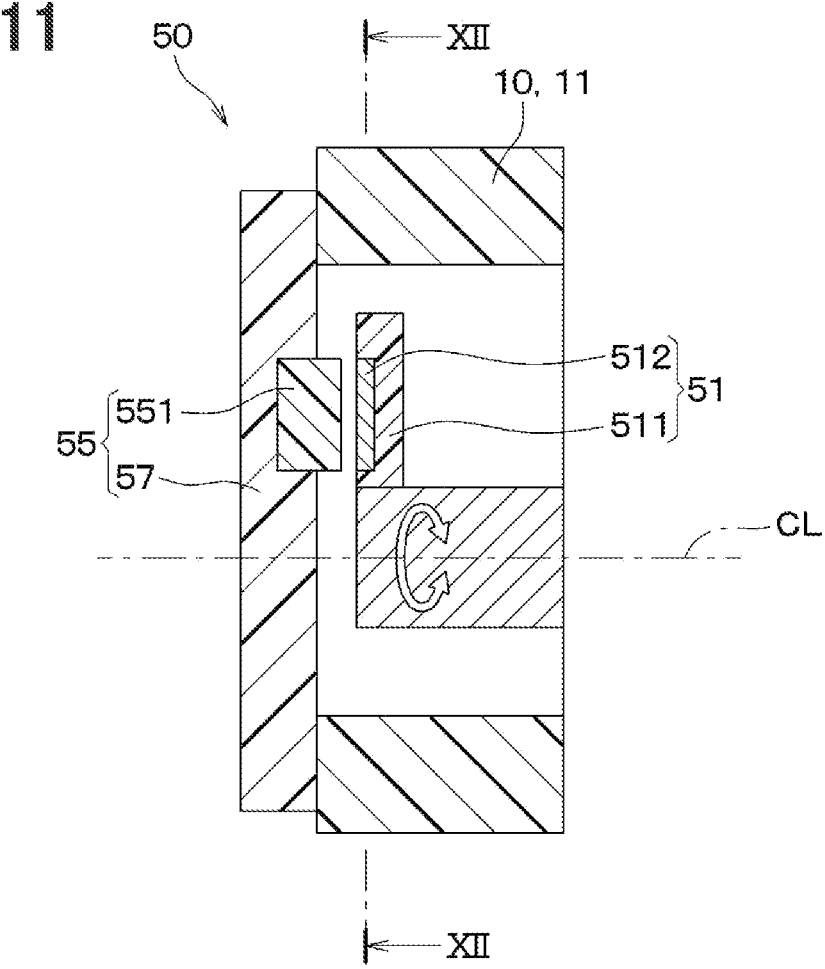
FIG. 11 is a cross-sectional view of a sensor unit provided in a pedal device according to a third embodiment.
Figure 12:
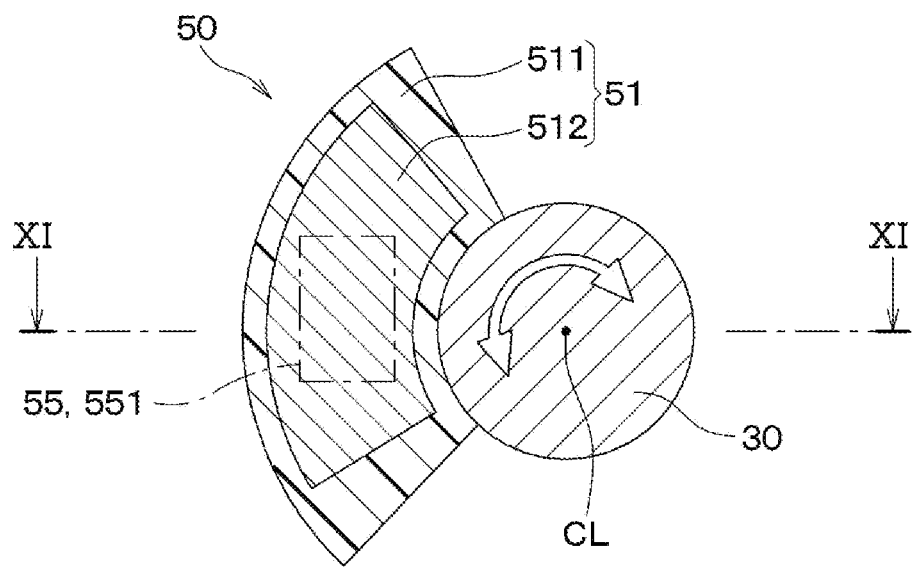
FIG. 12 is a cross-sectional view taken along a line XII-XII of FIG. 11.

As shown in FIGS. 11 and 12, a pedal device 1 of the third embodiment employs an inductive sensor unit 50 as a non-contact-type sensor unit 50, for example. The sensor unit 50 has a rotating portion 51 provided on a shaft 30 and a signal output portion 55 provided on a housing 10 for outputting a signal corresponding to the phase of the rotating portion 51.

In the rotating portion 51, for example, a detection portion 512 is insert-molded in a holding portion 511 that is fan-shaped on the radially outer side of the shaft 30. On the other hand, the signal output portion 55 is formed by insert-molding a sensor portion 551 into the sensor holding portion 57 fixed to the housing 10, for example. Note that, in FIG. 12, the position of the sensor portion 551 of the signal output portion 55 when the shaft 30 and the pedal pad 40 are at a predetermined rotation angle is indicated by a one dot chain line. When the shaft 30 and the pedal pad 40 rotate, the position of the detected portion 512 of the rotating portion 51 fixed to the shaft 30 changes with respect to the position of the sensor portion 551. The sensor portion 551 is configured to output an electric signal corresponding to the position of the detection portion 512. Therefore, the signal output portion 55 outputs an electric signal corresponding to the pedal rotation angle.

The pedal device 1 of the third embodiment described above can achieve the corresponding effects as the first embodiment and the like from the corresponding configuration as the first embodiment and the like. Further, in the third embodiment, the detected portion 512 and the sensor portion 551 of the sensor unit 50 can be arranged at positions radially displaced from the rotation axis CL of the shaft 30.

Fourth Embodiment

The following describes the fourth embodiment of the present disclosure. The fourth embodiment is different from the first embodiment and the like since it is the same as the first embodiment and the like, except that a part of the configuration of a sensor unit 50 is changed with respect to the first embodiment and the like. Thus, only the different part is explained.

Figure 13:
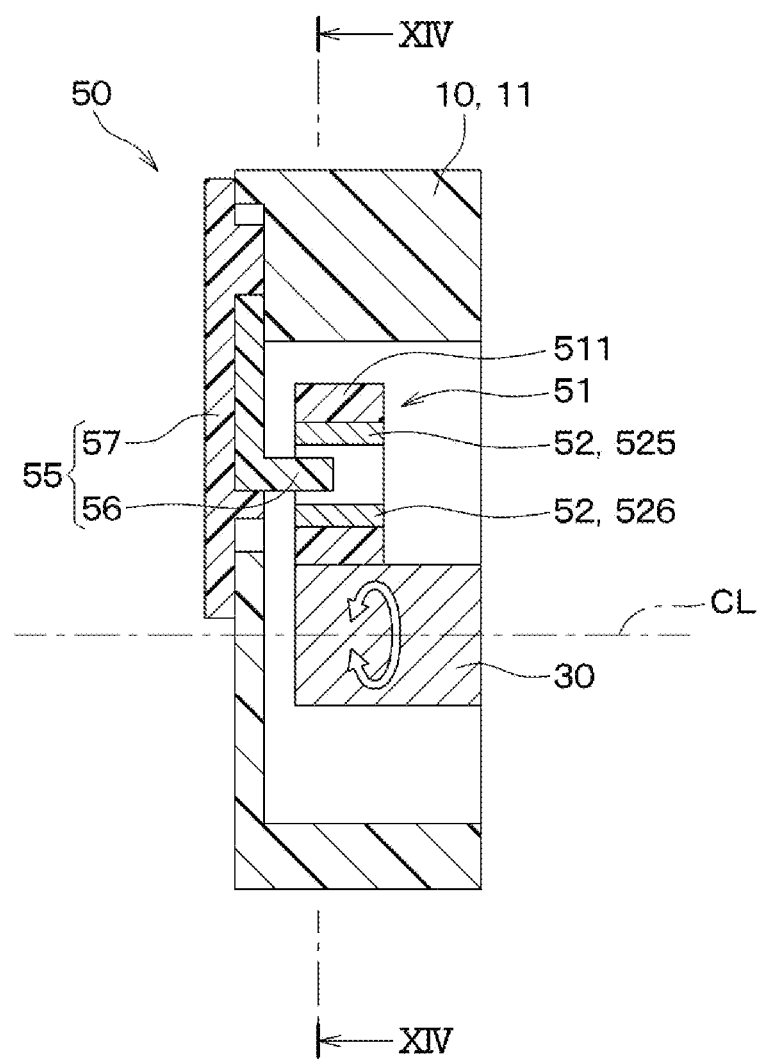
FIG. 13 is a cross-sectional view of a sensor unit provided in a pedal device according to a fourth embodiment.
Figure 14:
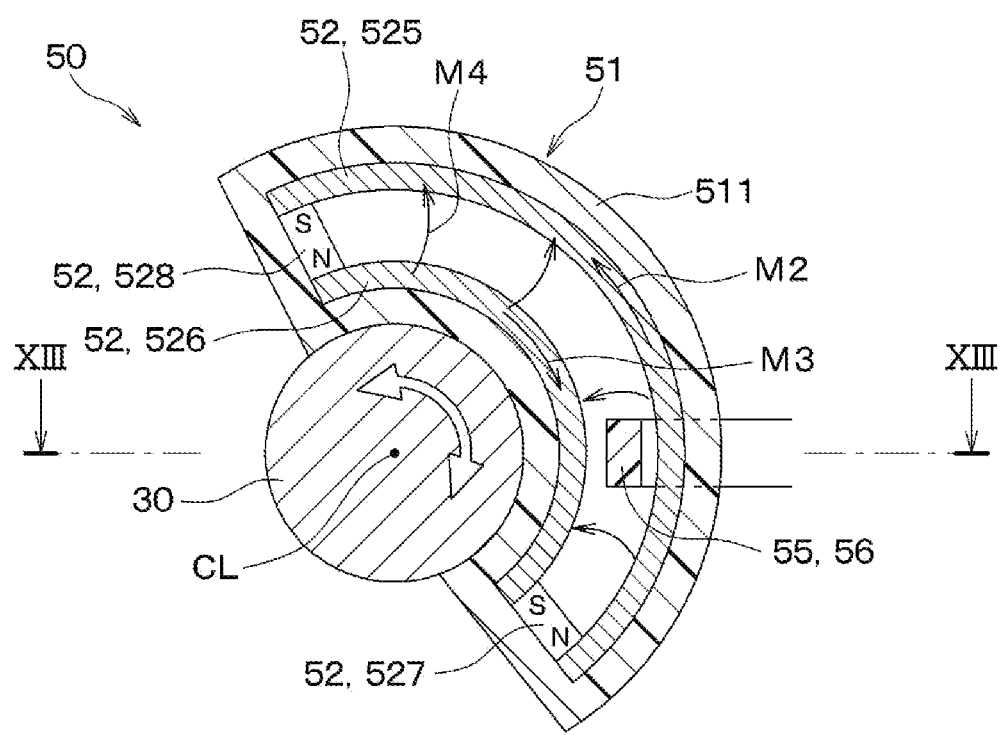
FIG. 14 is a cross-sectional view taken along a line XIV-XIV of FIG. 13.

As shown in FIGS. 13 and 14, a pedal device 1 of the fourth embodiment uses a Hall IC 56 as a non-contact-type sensor unit 50. The sensor unit 50 has a rotating portion 51 provided on a shaft 30 and a signal output portion 55 provided on a housing 10 for outputting a signal corresponding to the phase of the rotating portion 51.

The rotating portion 51 includes, for example, a magnetic circuit 52, which includes two arc-shaped yokes 525 and 526 provided radially outward of the shaft 30, and magnets 527 and 528 provided at both ends of the two yokes 525 and 526. A predetermined space is provided between the two yokes 525 and 526. The N pole of the first magnet 527 is connected to one end of the yoke 525 on the outer peripheral side, and the S pole of the second magnet 528 is connected to the other end thereof. The S pole of the first magnet 527 is connected to one end of the yoke 526 on the inner circumference side, and the N pole of the second magnet 528 is connected to the other end thereof. Therefore, as indicated by arrows M2 to M4 in FIG. 14, magnetic flux flows through the two yokes 525 and 526, and a magnetic field is formed in which the leakage magnetic flux flies in the space between the two yokes 525 and 526. The rotating portion 51 is fixed to one end of the shaft 30, and rotates together with the shaft 30. Therefore, the rotation center of the rotating portion 51 and the rotation axis CL of the shaft 30 are the same.

On the other hand, the signal output portion 55 includes the Hall IC 56 as a sensor portion, the sensor holding portion 57 for molding the Hall IC 56, and the like. The sensor holding portion 57 is positioned and fixed to the housing 10 by a positioning structure such as engaging and screws. When the rotating portion 51 rotates about the rotation axis CL together with the shaft 30, the magnetic flux density and the direction of the magnetic flux passing through the magnetic sensitive surface of the Hall element of the Hall IC 56 change. Therefore, the signal output portion 55 outputs an electric signal corresponding to the pedal rotation angle.

The pedal device 1 of the fourth embodiment described above can achieve the same effects as the first embodiment and the like from the corresponding configuration as the first embodiment and the like. Further, in the fourth embodiment, the rotating portion 51 of the sensor unit 50 and the Hall IC 56 as the sensor portion can be arranged at positions radially displaced from the rotation axis CL of the shaft 30.

Fifth Embodiment

The following describes a fifth embodiment of the present disclosure. The fifth embodiment is different from the first embodiment and the like, since it is the same as the first embodiment and the like, except that a part of the configuration of a sensor unit 50 is changed with respect to the first embodiment and the like. Thus, only the different part is mainly explained.

Figure 15:
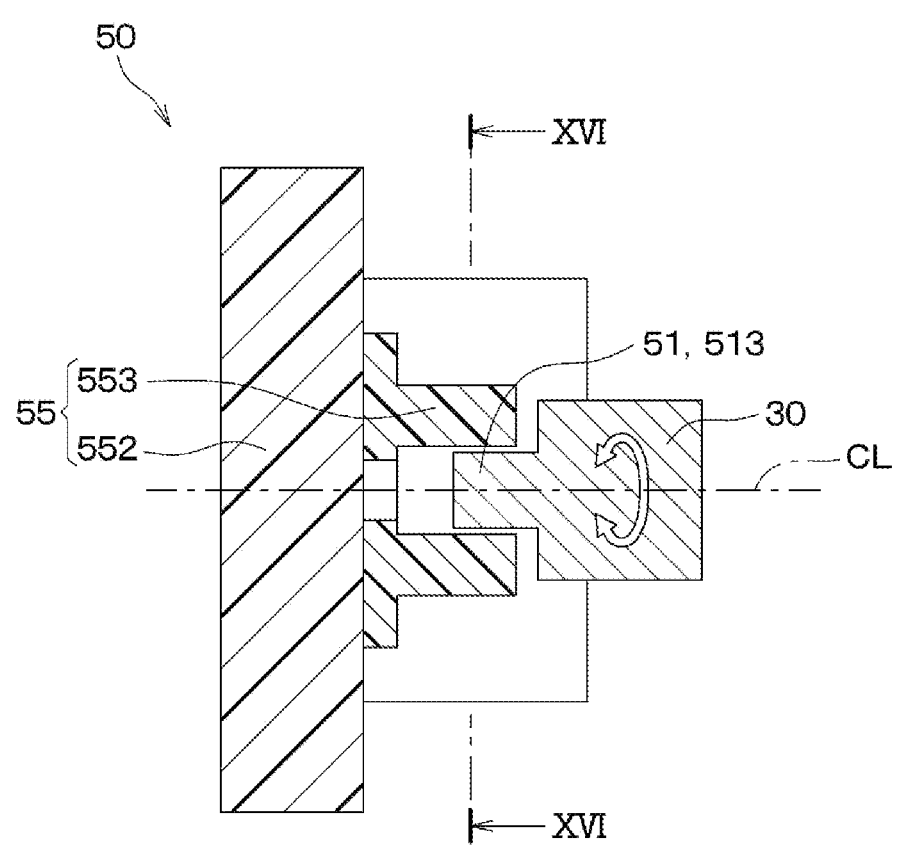
FIG. 15 is a cross-sectional view of a sensor unit provided in a pedal device according to a fifth embodiment.
Figure 16:
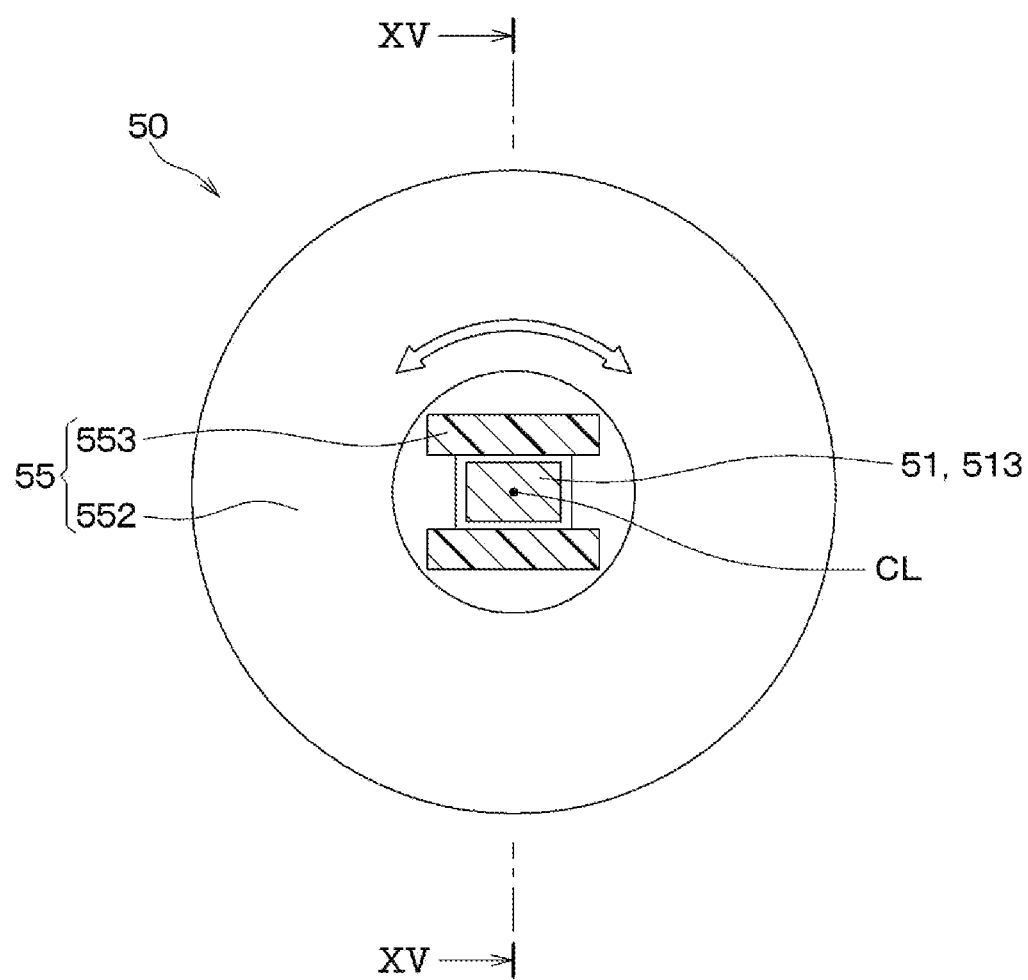
FIG. 16 is a cross-sectional view taken along a line XVI-XVI in FIG. 15.

As shown in FIGS. 15 and 16, a pedal device 1 of the fifth embodiment employs a contact-type sensor unit 50. The sensor unit 50 has a rotating portion 51 provided on a shaft 30 and a signal output portion 55 provided on a housing 10 for outputting a signal corresponding to the phase of the rotating portion 51.

The rotating portion 51 is, for example, a protrusion 513 provided at one axial end of the shaft 30. On the other hand, the signal output portion 55 has, for example, a fixing portion 552 fixed to a housing 10 and a sensor portion 553 rotatably provided with respect to the fixing portion 552. The sensor portion 553 engages the protrusion 513 provided on the shaft 30 and rotates together with the protrusion 513. An encoder, a potentiometer, or the like, for example, is employed as the signal output portion 55. The signal output portion 55 outputs a signal corresponding to the rotation angle of the sensor portion 553.

When the shaft 30 and the pedal pad 40 rotate, the rotation is transmitted from the protrusion 513 provided on the shaft 30 to the sensor portion 553, and the sensor portion 553 rotates. Therefore, the signal output portion 55 having the sensor portion 553 outputs an electric signal corresponding to the pedal rotation angle.

The pedal device 1 of the fifth embodiment described above can achieve the same effects as the first embodiment and the like from the corresponding configuration as the first embodiment and the like. Further, in the fifth embodiment, it is possible to arrange the rotating portion 51 and the sensor portion 553 of the sensor unit 50 on the rotation axis CL of the shaft 30.

Sixth Embodiment

The following describes the sixth embodiment of the present disclosure. The sixth embodiment is different from the first embodiment and the like, since the configuration of a sensor unit 50 is partly changed with respect to the first embodiment and the like, and the rest is the same as the first embodiment and the like. Thus, only a different part is mainly explained.

Figure 17:
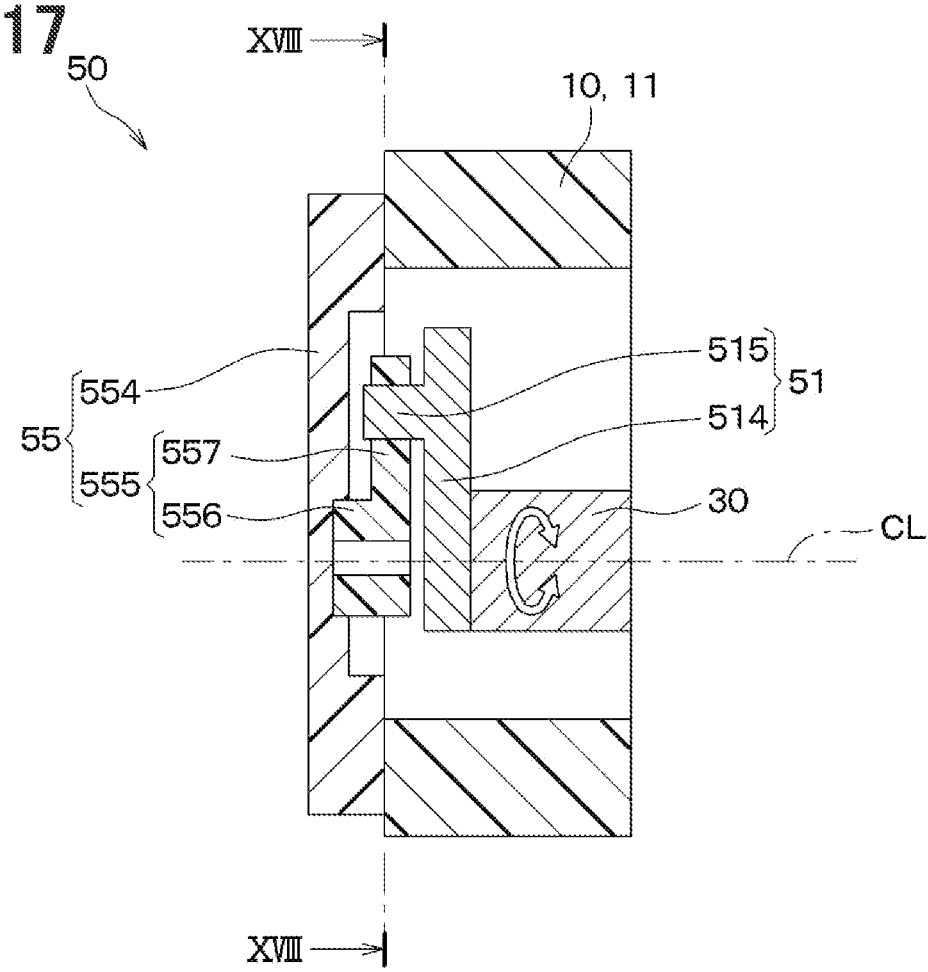
FIG. 17 is a cross-sectional view of a sensor unit provided in a pedal device according to a sixth embodiment.
Figure 18:
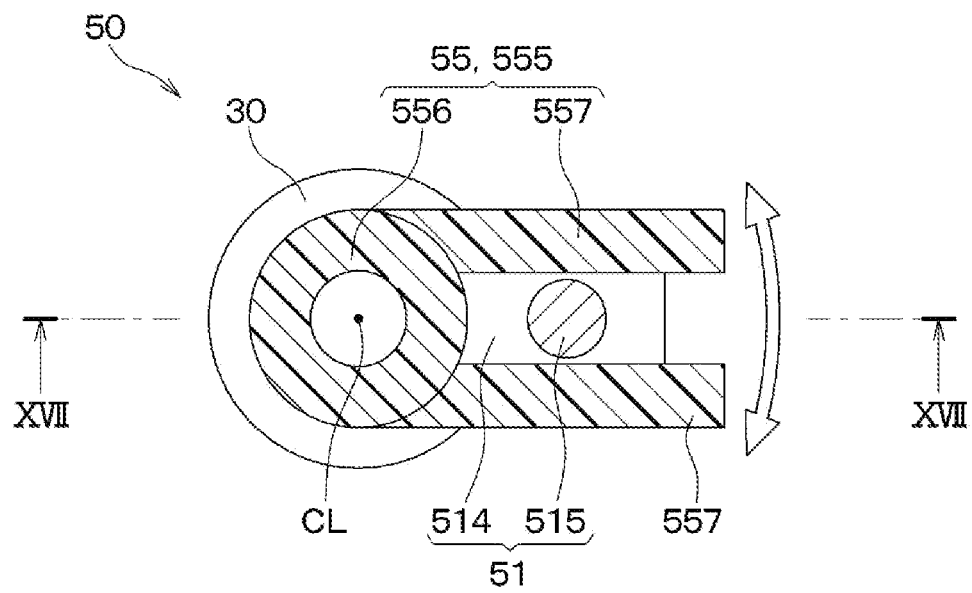
FIG. 18 is a cross-sectional view taken along a line XVIII-XVIII of FIG. 17.

As shown in FIGS. 17 and 18, a pedal device 1 of the sixth embodiment employs a contact-type sensor unit 50. The sensor unit 50 has a rotating portion 51 provided on a shaft 30, and a signal output portion 55 provided on a housing 10 for outputting a signal corresponding to the phase of the rotating portion 51.

The rotating portion 51 is configured by, for example, an arm portion 514 extending radially outward from the shaft 30 and a protrusion 515 provided on the arm portion 514. On the other hand, as the signal output portion 55, for example, an encoder, a potentiometer, or the like is adopted. The signal output portion 55 has, for example, a fixing portion 554 fixed to the housing 10 and a sensor portion 555 rotatably provided with respect to the fixing portion 554. The sensor portion 555 is configured by a cylindrical portion 556 provided coaxially with the rotation axis CL of the shaft 30, and two engaging portions 557 extending radially outward from the cylindrical portion 556. The two engaging portions 557 forming the sensor portion 555 engages a protrusion 515 forming the rotating portion 51, and rotate together with the protrusion 515. The signal output portion 55 outputs a signal corresponding to the rotation angle of the sensor portion 555.

When the shaft 30 and a pedal pad 40 rotate, the rotation is transmitted from the arm portion 514 and the protrusion 515 provided on the shaft 30 to the sensor portion 555, and the sensor portion 555 rotates. Therefore, the signal output portion 55 having the sensor portion 555 outputs an electric signal corresponding to the pedal rotation angle.

The pedal device 1 of the sixth embodiment described above can achieve the corresponding effects as the first embodiment and the like from the corresponding configuration as the first embodiment and the like.

Seventh Embodiment

The following describes the seventh embodiment of the present disclosure. The seventh embodiment is different from the first embodiment, and the like, since the configuration of a sensor unit 50 is partly changed with respect to the first embodiment, and the like, and the rest is the same as the first embodiment, and the like. Thus, only a different part is mainly explained.

Figure 19:
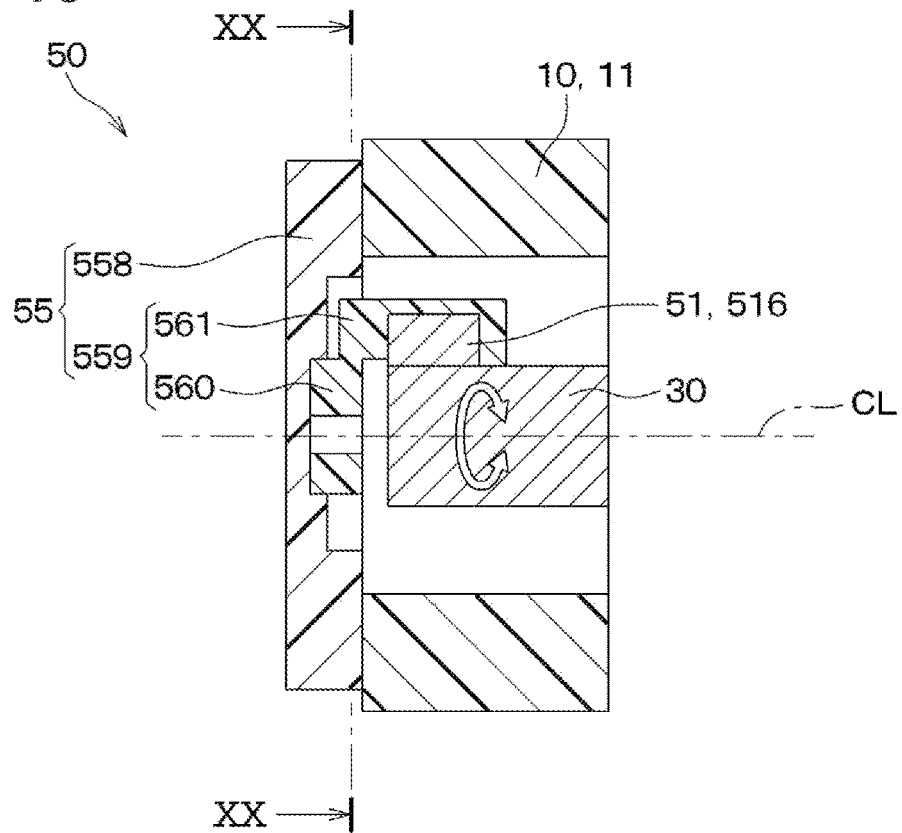
FIG. 19 is a cross-sectional view of a sensor unit provided in a pedal device according to a seventh embodiment.
Figure 20:
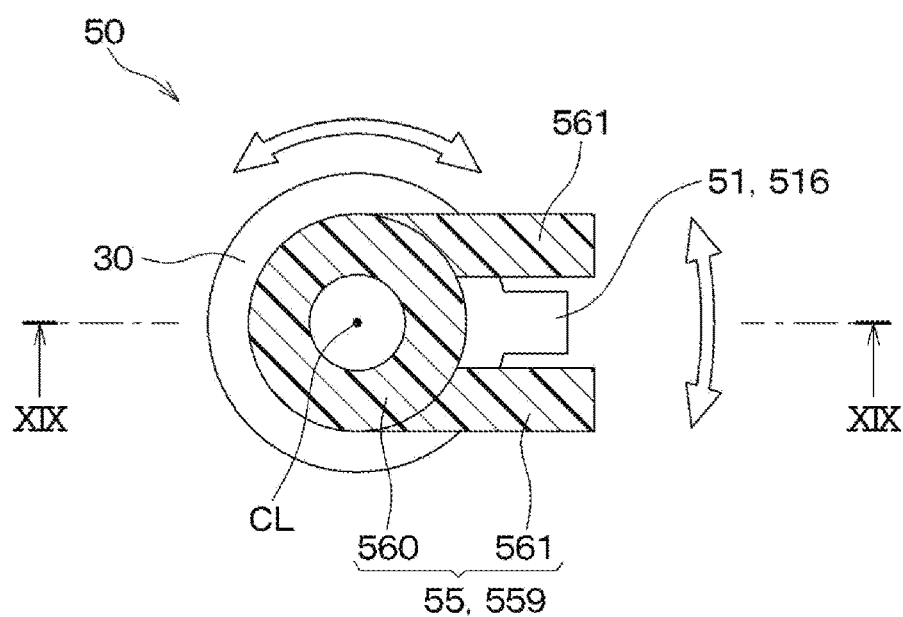
FIG. 20 is a cross-sectional view taken along a line XX-XX of FIG. 19.

As shown in FIGS. 19 and 20, a pedal device 1 of the seventh embodiment employs a contact-type sensor unit 50. The sensor unit 50 has a rotating portion 51 provided on a shaft 30, and a signal output portion 55 provided on a housing 10 for outputting a signal corresponding to the phase of the rotating portion 51.

The rotating portion 51 is configured by, for example, a protrusion 516 projecting radially outward from the shaft 30. The signal output portion 55 has, for example, a fixing portion 558 fixed to the housing 10 and a sensor portion 559 rotatably provided with respect to the fixing portion 558. The sensor portion 559 is configured by a cylindrical portion 560 provided coaxially with the rotation axis CL of the shaft 30 and two engaging portions 561 extending from an outer edge of the cylindrical portion 560 in parallel with the rotation axis CL. The two engaging portions 561 forming the sensor portion 559 engages the protrusion 516 of the rotating portion 51, and rotate together with the protrusion 516. The signal output portion 55 outputs a signal corresponding to the rotation angle of the sensor portion 559.

When the shaft 30 and a pedal pad 40 rotate, the rotation is transmitted from the protrusion 516 provided on the shaft 30 to the sensor portion 559, and the sensor portion 559 rotates. Therefore, the signal output portion 55 having the sensor portion 559 outputs an electric signal corresponding to the pedal rotation angle.

The pedal device 1 of the seventh embodiment described above can achieve the same effects as the first embodiment and the like from the corresponding configuration as the first embodiment and the like.

Eighth Embodiment

The eighth embodiment is described. The eighth embodiment demonstrates an example of a fixing method of a sensor unit 50 and a housing 10 with respect to the first embodiment.

Figure 21:
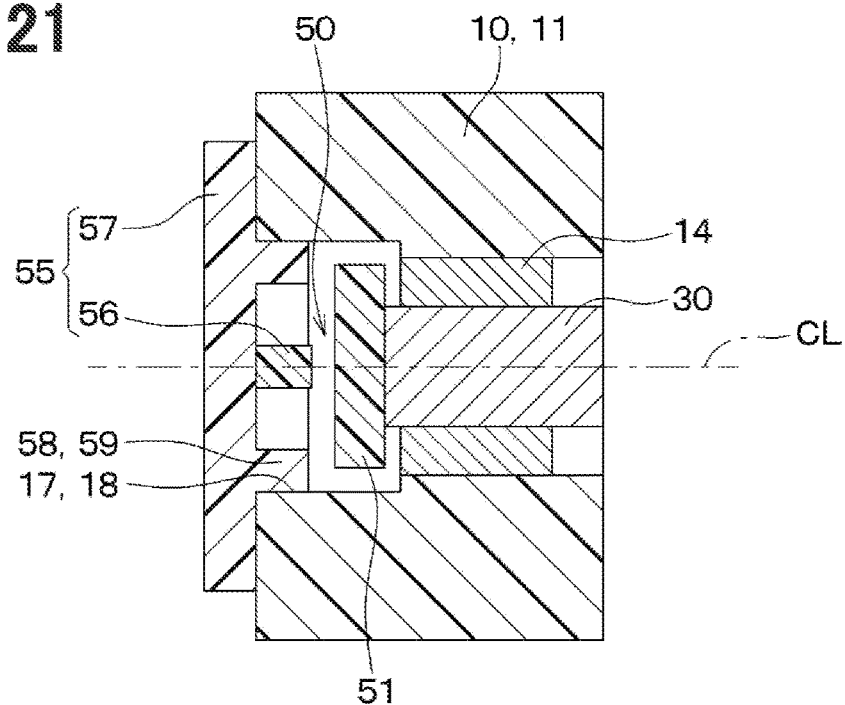
FIG. 21 is a cross-sectional view of a sensor unit provided in a pedal device and its proximity according to an eighth embodiment.

As shown in FIG. 21, in the eighth embodiment, a non-contact-type sensor is employed as the sensor unit 50 provided in a pedal device 1. The sensor unit 50 has a rotating portion 51 provided on a shaft 30 and a signal output portion 55 provided on a housing 10.

An opening 18 for installing the signal output portion 55 of the sensor unit 50 is provided at a position corresponding to one end of the shaft 30 in the housing 10. On the other hand, a sensor holding portion 57 of the signal output portion 55 is provided with a protrusion 59 that engages with the inner wall surface of an opening 18 provided in the housing 10. The inner wall surface of the opening 18 provided in the housing 10 and the outer wall surface of the protrusion 59 provided in the sensor holding portion 57 of the signal output portion 55 constitute a positioning structure that allows the sensor center of the signal output portion 55 to be assembled to a predetermined position which enable detection of the phase of the rotating portion 51. This positioning structure enables the sensor center of the signal output portion 55 and the rotation axis CL of the shaft 30 to be coaxially assembled. Note that the configuration of the sensor unit 50 and the configuration of the positioning structure are not limited to those illustrated above, and various other configurations are adoptable.

The pedal device 1 of the eighth embodiment described above has the corresponding configuration as that of the first embodiment, thereby exerting the same effect as the first embodiment.

Ninth Embodiment

The ninth embodiment is described. The ninth embodiment describes an example of a method of fixing a sensor unit 50 and a housing 10 with respect to the first embodiment and the like.

Figure 22:
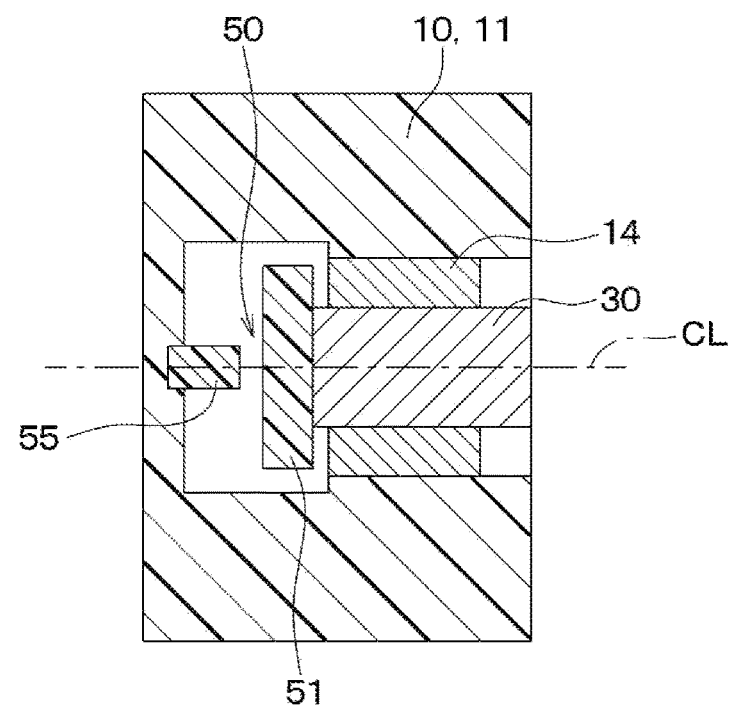
FIG. 22 is a cross-sectional view of a sensor unit provided in a pedal device and its proximity according to a ninth embodiment.

As shown in FIG. 22, the ninth embodiment employs a non-contact-type sensor as the sensor unit 50 provided in a pedal device 1. The sensor unit 50 has a rotating portion 51 provided at a shaft 30 and a signal output portion 55 provided at the housing 10.

The signal output portion 55 of the sensor unit 50 is fixed integrally with the housing 10 in a state in which a portion thereof is embedded in the housing 10. A method of insert-molding the signal output portion 55 into the housing 10 is exemplified as a method of embedding a portion of the signal output portion 55 in the housing 10. As a result, the sensor center of the signal output portion 55 is assembled at a predetermined position where the phase of the rotating section 51 is detectable. In the present embodiment, the sensor center of the signal output portion 55 is assembled coaxially with the rotation axis CL of the shaft 30.

Since the pedal device 1 of the ninth embodiment described above has the corresponding configuration as that of the first embodiment, the same effects as those of the first embodiment are achievable. Further, in the ninth embodiment, the configuration of the sensor unit 50 is simplified, and it is possible to prevent displacement of the sensor center of the signal output portion 55 from a predetermined position where the phase of the rotating section 51 is detectable (from the rotation axis CL of the shaft 30, in the present embodiment).

Tenth Embodiment

The tenth embodiment is described. The tenth embodiment describes an example of a fixing method between a sensor unit 50 and a housing 10 with respect to the first embodiment and the like.

Figure 23:
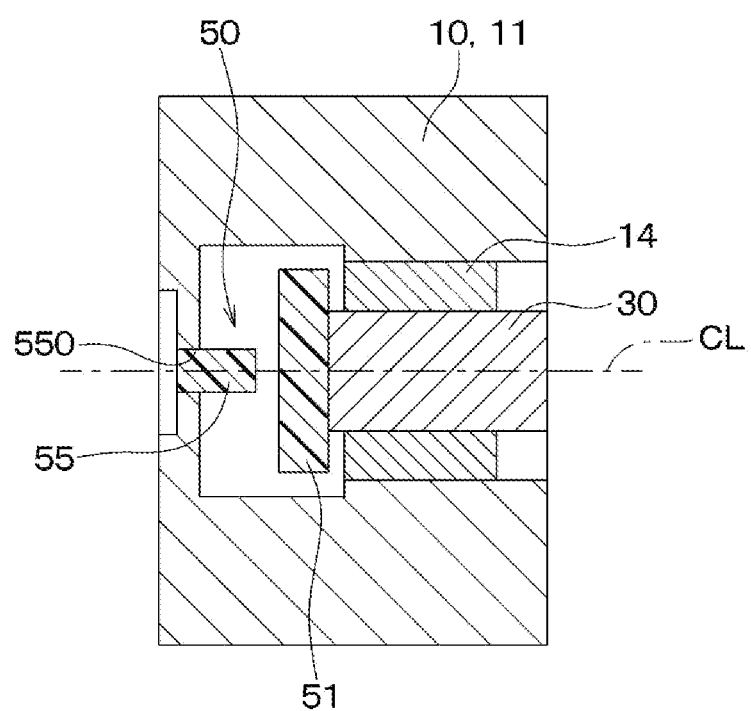
FIG. 23 is a cross-sectional view of a sensor unit provided in a pedal device and its proximity according to a tenth embodiment.

As shown in FIG. 23, the tenth embodiment employs a non-contact-type sensor as the sensor unit 50 provided in a pedal device 1. The sensor unit 50 has a rotating portion 51 provided on a shaft 30 and a signal output portion 55 provided on the housing 10.

Also in the tenth embodiment, the signal output portion 55 of the sensor unit 50 is fixed integrally with the housing 10 in a state in which a portion thereof is embedded in the housing 10. The housing 10 is provided with an insertion hole 550 for inserting the signal output portion 55. The center of the insertion hole 550 is provided on the rotation axis CL of the shaft 30. The signal output portion 55 is fixed while being inserted into the insertion hole 550 of the housing 10. As a result, the sensor center of the signal output portion 55 is assembled at a predetermined position where the phase of the rotating section 51 is detectable. Also in the present embodiment, the sensor center of the signal output portion 55 is assembled coaxially with the rotation axis CL of the shaft 30.

Since the pedal device 1 of the tenth embodiment described above has the corresponding configuration as that of the first embodiment, it is possible to achieve the same effect as that of the first embodiment. The tenth embodiment simplifies the configuration of the sensor unit 50, and furthermore, the sensor center of the signal output portion 55 is prevented from moving away from a predetermined position where the phase of the rotating section 51 is detectable (i.e., from the rotation axis CL of the shaft 30, in the present embodiment).

Eleventh Embodiment

The eleventh embodiment is described. In the eleventh embodiment, a fixing method between a shaft 30 and a pedal pad 40 is changed with respect to the first embodiment and the like. Thus, only a different part is mainly explained.

Figure 24:
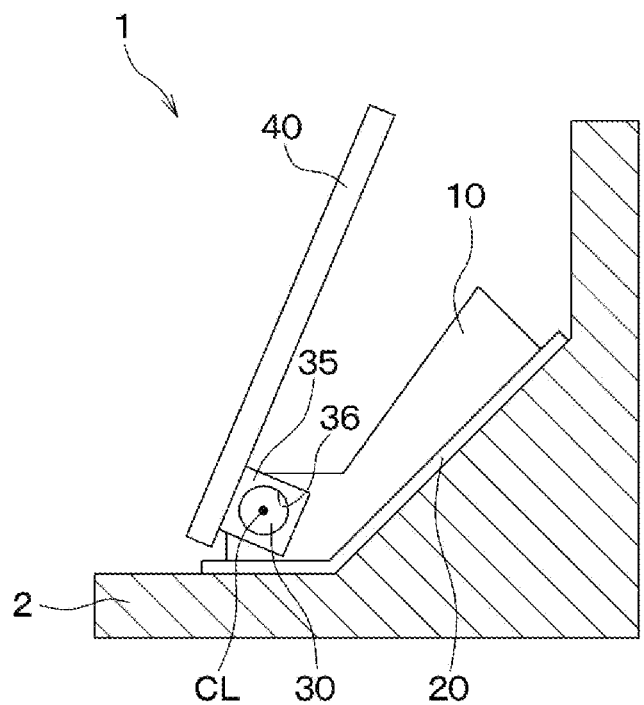
FIG. 24 is a schematic diagram of a pedal device according to an eleventh embodiment.

As shown in FIG. 24, in the eleventh embodiment, a connecting member 35 is fixed on a back surface of the pedal pad 40 at a position near a floor 2. The connecting member 35 has a hole 36 into which the shaft 30 is inserted. The shaft 30 is inserted into the hole 36 of the connecting member 35. Although not illustrated, the shaft 30 is rotatably supported by a shaft receiving portion 13 provided in the housing body 11. The shaft 30 is rotatable about an axis, i.e., the center of the shaft receiving portion 13 (that is, the center of the shaft 30).

The pedal pad 40 rotates about the same rotation axis CL as the shaft 30. That is, the rotation axis CL of the pedal pad 40 and the rotation axis CL of the shaft 30 are the same. In a state in which the stepping force of the driver is not applied to the pedal pad 40, the rotation axis CL of the pedal pad 40 and the shaft 30 is positioned separately, or away, closer to a vehicle front than a lower portion of the pedal pad 40, i.e., a portion of the pedal pad 40 at the same height or lower as to the rotation axis CL (that is, below means closer to the floor 2). Although not shown, in the eleventh embodiment as well, the sensor unit 50, having the rotating portion 51 provided on the shaft 30 and the signal output portion 55 that outputs a signal corresponding to the phase of the rotating portion 51, is configured to directly detect the pedal rotation angle.

The pedal device 1 of the eleventh embodiment described above can achieve the same effects as the first embodiment from the corresponding configuration as the first embodiment. Further, in the eleventh embodiment, the pedal pad 40 and the shaft 30 are fixed by the connecting member 35, and the center of the shaft 30 serves as the rotation axis CL of the pedal pad 40. The shaft 30 is rotatably supported by the shaft receiving portion 13 of the housing 10. Therefore, the pedal pad 40 and the shaft 30 have an improved strength and durability at or around the rotation axis CL. Furthermore, in the eleventh embodiment, the structure of the shaft 30 is simplified, and the shaft 30 and the pedal pad 40 are fixed with a simple structure.

Twelfth Embodiment

The twelfth embodiment is described. The twelfth embodiment describes an example of the configuration of a shaft 30 with respect to the first embodiment and the like.

Figure 25:
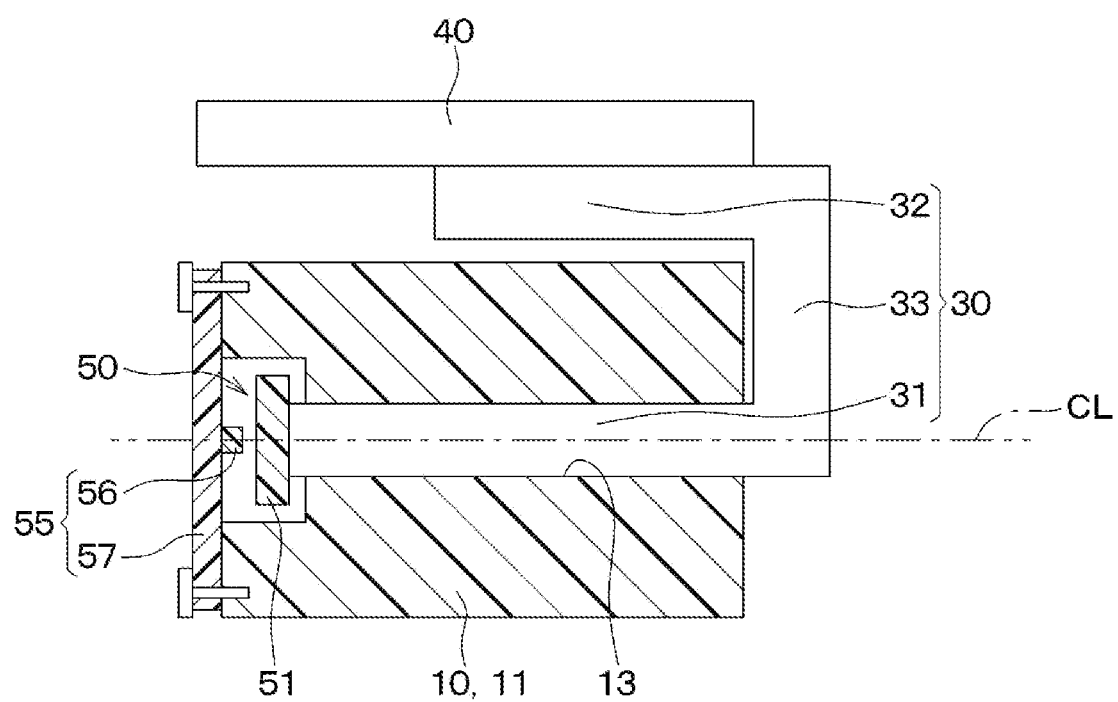
FIG. 25 is a cross-sectional view showing a shaft of a pedal device and its proximity according to a twelfth embodiment.

As shown in FIG. 25, in the twelfth embodiment, the shaft 30 is formed by bending a columnal metal piece multiple times, and has a shaft portion 31, a fixing portion 32 and a connecting portion 33. The shaft portion 31 is a portion that extends parallel to the center line of a shaft receiving portion 13 (that is, the rotation axis CL of the shaft 30) and is arranged in the shaft receiving portion 13. The fixing portion 32 is a portion that is non-rotatably fixed to a pedal pad 40. Specifically, the fixing portion 32 is fixed to the back surface of the pedal pad 40. The connecting portion 33 is a portion that connects the shaft portion 31 and the fixing portion 32. Since the shaft 30 has the shaft portion 31, the fixing portion 32, and the connecting portion 33, the rotation axis CL of the shaft 30 and the pedal pad 40 are arrangeable at positions separated from each other, and a sensor unit 50 is easily arrangeable in a space around the rotation axis CL. Therefore, the sensor unit 50 can directly detect the pedal rotation angle. Further, in the configuration in which the center of the shaft portion 31 of the shaft 30 is used as the rotation axis CL of the pedal pad 40, and the shaft portion 31 is rotatably supported by the shaft receiving portion 13 of the housing 10, thereby the pedal pad 40 and the shaft 30 have an improved strength and durability at or around the rotation axis CL. The twelfth embodiment described above can achieve the same effects as the first embodiment from the corresponding configuration as the first embodiment.

Thirteenth Embodiment

The thirteenth embodiment is described. The thirteenth embodiment describes an example of the configuration of a shaft 30 with respect to the first embodiment and the like.

Figure 26:
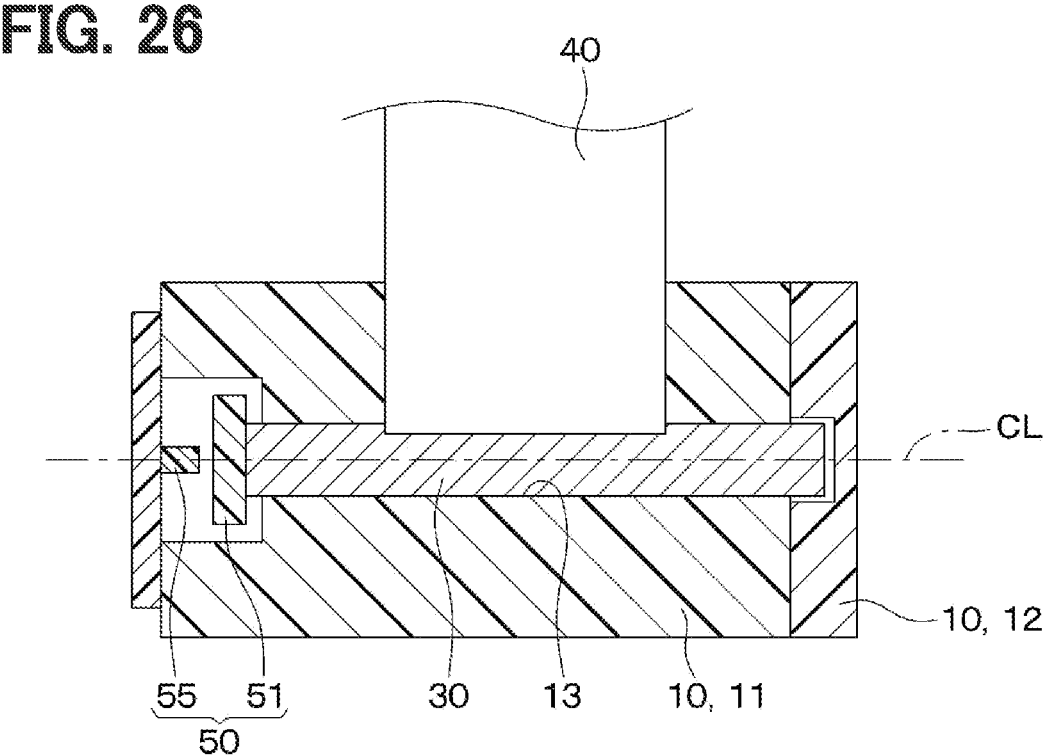
FIG. 26 is a cross-sectional view showing a shaft of a pedal device and its proximity according to a thirteenth embodiment.

As shown in FIG. 26, in the thirteenth embodiment, the shaft 30 is slidably contacted by an inner wall of a shaft receiving portion 13 provided in a housing 10 and is directly rotatably supported. The shaft 30 is supported only by a shaft receiving portion 13 provided on a housing body 11 and is not supported by a housing cover 12. In the thirteenth embodiment, the configuration of the shaft receiving portion 13 that supports the shaft 30 can be simplified.

Fourteenth Embodiment

The fourteenth embodiment is described. The fourteenth embodiment describes an example of the configuration of a shaft 30 with respect to the first embodiment and the like.

Figure 27:
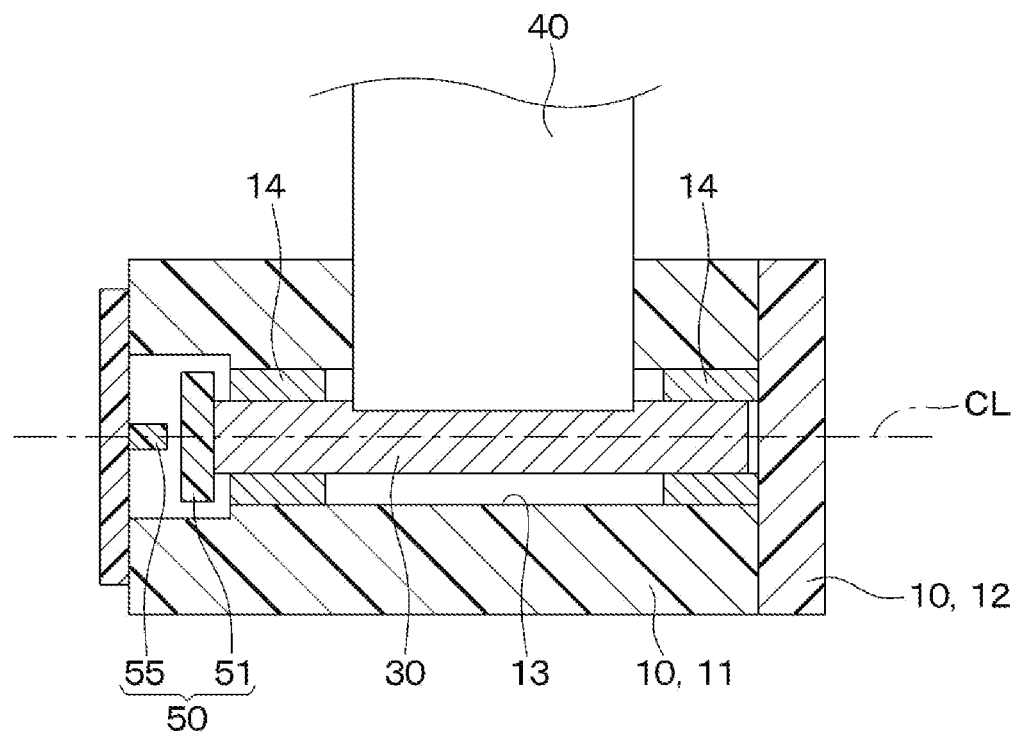
FIG. 27 is a cross-sectional view showing a shaft of a pedal device and its proximity according to a fourteenth embodiment.

As shown in FIG. 27, in the fourteenth embodiment, a cylindrical bearing 14 is attached to a shaft receiving portion 13 provided in a housing body 11 of a housing 10. The shaft 30 is rotatably supported by the bearing 14. Therefore, the shaft 30 can rotate about the center of the shaft receiving portion 13 (that is, the center of the bearing 14). The shaft 30 is supported only by the bearing 14 of the shaft receiving portion 13 provided in the housing body 11 and is not supported by the housing cover 12.

In the fourteenth embodiment described above, it is possible to reduce wear of the housing 10 and the shaft receiving portion 13 by arranging the bearing 14 between the shaft receiving portion 13 provided in the housing body 11 and the shaft 30. Therefore, tilting of the rotation axis CL of the pedal pad 40 and the shaft 30 with respect to the housing 10 fixing a signal output portion 55 of a sensor unit 50 is prevented, thereby improving the detection accuracy of the pedal rotation angle by the sensor unit 50.

Fifteenth Embodiment

The fifteenth embodiment is described. The fifteenth embodiment does not have a base plate 20 compared to the first embodiment and the like, and is otherwise the same as the first embodiment and the like. Thus, only the parts different from the first embodiment and the like are described.

Figure 28:
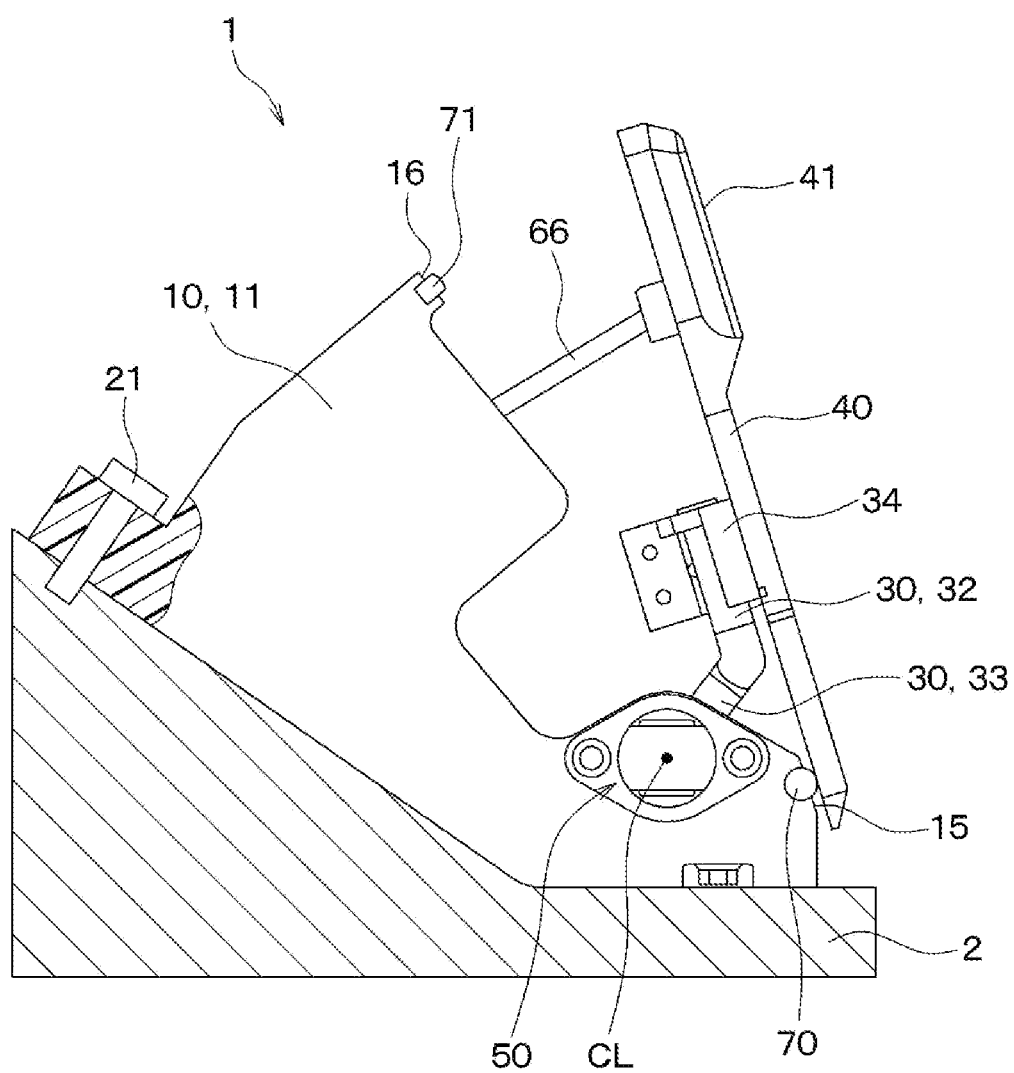
FIG. 28 is a side view of a pedal device according to a fifteenth embodiment.

As shown in FIG. 28, a pedal device 1 does not have the base plate 20 in the fifteenth embodiment. Therefore, a housing 10 provided in a pedal device 1 is directly attached to a floor 2 or a dash panel in a passenger compartment of a vehicle with bolts 21 or the like. The fifteenth embodiment described above can achieve the same effects as the first embodiment from the corresponding configuration as the first embodiment. Also, in the fifteenth embodiment, the number of parts of the pedal device 1 is reducible.

Other Embodiments (1) In each of the above embodiments, the brake pedal device is described as an example of the pedal device 1, but the present disclosure is not limited thereto. For example, the pedal device 1 can be an accelerator pedal device. Alternatively, the pedal device 1 can be various devices that are operated by the driver's foot.

(2) In each of the above embodiments, as an example of the pedal device 1, a configuration is described in which the pedal pad 40 and the master cylinder 126 are not mechanically connected, but the present disclosure is not limited thereto. For example, the pedal device 1 may be the one in which the pedal pad 40 and the master cylinder 126 are mechanically connected.

(3) In each of the embodiments described above, as an example of the reaction force generating mechanism 60, a combination of the leaf spring 61 and a plurality of coil springs has been described, but the present disclosure is not limited thereto. For example, the reaction force generating mechanism 60 may be configured by one or more coil springs, or may be configured by one or more leaf springs. Alternatively, the pedal pad 40 and the master cylinder 126 may be mechanically connected so that the master cylinder 126 generates a reaction force against the stepping force applied to the pedal pad 40 by the driver.

(4) In each of the above-described embodiments, as an example of the positioning structure between the signal output portion 55 and the housing 10, for example, a configuration is described in which the convex portion 58 provided on the signal output portion 55 and the concave portion 17 provided on the housing 10 are engaged, but the present disclosure is not limited thereto. For example, the positioning structure may be configured such that a concave portion provided on the signal output portion 55 and a convex portion provided on the housing 10 are engaged. Various structures such as grooves or holes can be used as the concave portions, and various structures such as pins or ribs can be used as the convex portions.

(5) In each of the above embodiments, the brake-by-wire system 100 causes the master cylinder 126 to generate hydraulic pressure in the brake fluid flowing through the brake circuit 120, but the present disclosure is not limited thereto. For example, a hydraulic pump may be used to generate hydraulic pressure in the brake fluid flowing through the brake circuit 120.

(6) In the first embodiment, the ECU 110 is configured by the first ECU 111 and the second ECU 112, but the present disclosure is not limited thereto. For example, one ECU or three or more ECUs may be used.

(7) In the first, second, eighth to fourteenth embodiments, the positioning structure configured by the signal output portion 55 of the sensor unit 50 and the housing 10 is such that the sensor center of the signal output portion 55 is assembled on the rotation axis CL. However, the positioning structure is not limited thereto. For example, as shown in the third and fourth embodiments, the positioning structure is such that the sensor center of the signal output portion 55 is positioned at a predetermined position where the phase of the rotating section 51 is detectable (e.g., it may be assembled at a position displaced from the rotation axis CL).

The present disclosure is not limited to the above-described embodiments, and can be appropriately modified. The above-described embodiments are not independent of each other, and can be appropriately combined together except when the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, a shape, positional relationship or the like of a structural element, which is referred to in the embodiments described above, is not limited to such a shape, positional relationship or the like, unless it is specifically described or obviously necessary to be limited in principle.

What is claimed is:

1. A pedal device, configured to transmit an electric signal corresponding to an amount of a pedal operation by a driver to an electronic control device of a vehicle, the pedal device comprising:
    a housing attached to a vehicle body;
    a shaft rotatably supported around a center of a shaft receiving portion provided in the housing as a rotation axis;
    a pedal pad rotatable around a same rotation axis as the shaft, wherein a stepped portion of the pedal pad that is stepped on by the driver is positioned above in a vertical direction relative to the rotation axis when being mounted on the vehicle; and
    a sensor unit including a rotating portion provided at the shaft, and a signal output portion provided at the housing to output a signal corresponding to a position of the rotating portion, wherein
    the sensor unit is configured to detect a rotation angle of the pedal pad and the shaft; and
    a base plate provided on a surface of the housing opposite to the pedal pad, to be fixed to the vehicle body, wherein
    the base plate is made of a material having higher strength than the housing.

2. The pedal device of claim 1, wherein
    the sensor unit is a non-contact-type sensor configured to detect the rotation angle of the pedal pad and the shaft without a contact between the rotating portion and the signal output portion.

3. The pedal device of claim 1, wherein
    the rotating portion includes a magnetic circuit configured to form a magnetic field, and
    the signal output portion includes a Hall IC that outputs an electric signal corresponding to the magnetic field that changes with rotation of the pedal pad and the shaft.

4. The pedal device of claim 1, wherein
    both a rotation center of the rotating portion and a sensor center of the signal output portion are arranged on the rotation axis.

5. The pedal device of claim 1, wherein
    the signal output portion and the housing are integrally fixed in a state in which at least a portion of the signal output portion is embedded in the housing.

6. The pedal device of claim 1, wherein
    the rotation axis is positioned closer to a front of the vehicle than a portion of the pedal pad in a state where a stepping force of the driver is not applied to the pedal pad, and the portion of the pad is at a same height or lower than the rotation axis.

7. The pedal device of claim 1, wherein
    the pedal device is a brake pedal used in a brake-by-wire system in which a brake circuit generates a hydraulic pressure necessary for braking the vehicle by a drive control of the electronic control device based on the output signal of the sensor unit.

8. The pedal device of claim 1, wherein the pedal pad is integrated with the shaft.

9. The pedal device of claim 1, wherein the pedal pad and the shaft constitute an integrally formed member.

10. A pedal device, configured to transmit an electric signal corresponding to an amount of a pedal operation by a driver to an electronic control device of a vehicle, the pedal device comprising:
    a housing attached to a vehicle body;
    a shaft rotatably supported around a center of a shaft receiving portion provided in the housing as a rotation axis;
    a pedal pad rotatable around a same rotation axis as the shaft, wherein a stepped portion of the pedal pad that is stepped on by the driver is positioned above in a vertical direction relative to the rotation axis when being mounted on the vehicle; and
    a sensor unit including a rotating portion provided at the shaft, and a signal output portion provided at the housing to output a signal corresponding to a position of the rotating portion, wherein
    the sensor unit is configured to detect a rotation angle of the pedal pad and the shaft; and
    the signal output portion and the housing have a positioning structure configured to allow the sensor center of the signal output portion to be assembled at a predetermined position where the position of the rotating portion is detectable, and
    the positioning structure includes:
    a convex portion provided at one of the signal output portion and the housing; and a concave portion provided on the other one of the signal output portion and the housing to be engaged with the convex portion.

11. The pedal device of claim 10, wherein
the concave portion is an inner wall surface of an opening provided in the housing, and
the convex portion is an outer wall surface of a sensor holding portion provided in the signal output portion.

12. The pedal device of claim 10, wherein the pedal pad is integrated with the shaft.

13. The pedal device of claim 10, wherein the pedal pad and the shaft constitute an integrally formed member.

14. A pedal device, configured to transmit an electric signal corresponding to an amount of a pedal operation by a driver to an electronic control device of a vehicle, the pedal device comprising:
a housing attached to a vehicle body;
a shaft rotatably supported around a center of a shaft receiving portion provided in the housing as a rotation axis;
a pedal pad rotatable around a same rotation axis as the shaft, wherein a stepped portion of the pedal pad that is stepped on by the driver is positioned above in a vertical direction relative to the rotation axis when being mounted on the vehicle; and
a sensor unit including a rotating portion provided at the shaft, and a signal output portion provided at the housing to output a signal corresponding to a position of the rotating portion, wherein
the sensor unit is configured to detect a rotation angle of the pedal pad and the shaft; and
the housing includes:
a housing body provided with the shaft receiving portion and a part of a positioning structure capable of assembling the sensor center of the signal output portion at a predetermined position to detect the position of the rotating portion; and
a housing cover closing a side opening of a space provided inside the housing body without supporting the shaft and without having a part of the positioning structure.

15. The pedal device of claim 14, further comprising:
a bearing arranged at a position between the housing body and the shaft.

16. The pedal device of claim 14, wherein the pedal pad is integrated with the shaft.

17. A pedal device, configured to transmit an electric signal corresponding to an amount of a pedal operation by a driver to an electronic control device of a vehicle, the pedal device comprising:
a housing attached to a vehicle body;
a shaft rotatably supported around a center of a shaft receiving portion provided in the housing as a rotation axis;
a pedal pad rotatable around a same rotation axis as the shaft, wherein a stepped portion of the pedal pad that is stepped on by the driver is positioned above in a vertical direction relative to the rotation axis when being mounted on the vehicle; and
a sensor unit including a rotating portion provided at the shaft, and a signal output portion provided at the housing to output a signal corresponding to a position of the rotating portion, wherein
the sensor unit is configured to detect a rotation angle of the pedal pad and the shaft;
a full-open stopper defining a maximum rotation position of the pedal pad, the full-open stopper being provided at a portion of the housing on a front side of the vehicle with respect to the rotation axis, and directly contacting the pedal pad when the stepping force of the driver applied to the pedal pad increases; and
a full-close stopper defining a minimum rotation position of the pedal pad, the full-close stopper being provided at a portion of the housing on a rear side of the vehicle relative to the rotation axis, and directly contacting the pedal pad when the stepping force of the driver is not applied to the pedal pad.

18. The pedal device of claim 17, wherein the pedal pad is integrated with the shaft.

19. A pedal device, configured to transmit an electric signal corresponding to an amount of a pedal operation by a driver to an electronic control device of a vehicle, the pedal device comprising:
a housing attached to a vehicle body;
a shaft rotatably supported around a center of a shaft receiving portion provided in the housing as a rotation axis;
a pedal pad fixed to the shaft to be rotatable around a same rotation axis as the shaft, wherein a stepped portion of the pedal pad that is stepped on by the driver is positioned above in a vertical direction relative to the rotation axis when being mounted on the vehicle; and
a sensor unit including a rotating portion provided at the shaft, and a signal output portion provided at the housing to output a signal corresponding to a position of the rotating portion, wherein
the sensor unit is configured to detect a rotation angle of the pedal pad and the shaft;
the shaft includes:
a rotatable shaft portion; and
a fixing portion connected to the rotatable shaft portion and non-rotatably fixed to the pedal pad.

20. The pedal device of claim 19, wherein
the shaft includes:
the shaft portion rotatably supported by the shaft receiving portion and extending parallel to the rotation axis;
the fixing portion non-rotatably fixed to the pedal pad; and
a connecting portion connecting the shaft portion and the fixing portion.

* * * * *